United States Patent [19]

Hartung

[11] Patent Number: 4,571,674
[45] Date of Patent: Feb. 18, 1986

[54] PERIPHERAL STORAGE SYSTEM HAVING MULTIPLE DATA TRANSFER RATES

[75] Inventor: Michael H. Hartung, Tucson, Ariz.

[73] Assignee: International Business Machines Corporation, Armonk, N.Y.

[21] Appl. No.: 423,962

[22] Filed: Sep. 27, 1982

[51] Int. Cl.[4] .............................................. G06F 12/08
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,569,938 | 3/1971 | Eden et al. | 364/200 |
| 3,588,839 | 6/1971 | Belady et al. | 364/200 |
| 3,670,307 | 6/1972 | Arnold et al. | 364/200 |
| 3,670,309 | 6/1972 | Amdahl et al. | 364/200 |
| 3,699,530 | 10/1972 | Capowski et al. | 364/200 |
| 3,721,961 | 3/1973 | Edstrom et al. | 364/200 |
| 3,735,360 | 5/1973 | Anderson et al. | 364/200 |
| 3,812,475 | 5/1974 | Christiansen et al. | 364/200 |
| 3,839,704 | 10/1974 | Spencer | 364/200 |
| 4,020,466 | 4/1977 | Cordi et al. | 364/200 |
| 4,053,752 | 10/1977 | DeJohn et al. | 364/200 |
| 4,084,231 | 4/1978 | Capozzi et al. | 364/200 |
| 4,142,234 | 2/1979 | Bean et al. | 364/200 |
| 4,157,586 | 6/1979 | Gannon et al. | 364/200 |
| 4,159,517 | 6/1979 | Paradine et al. | 364/200 |
| 4,189,770 | 2/1980 | Gannon et al. | 364/200 |

Primary Examiner—Thomas M. Heckler
Attorney, Agent, or Firm—H. F. Somermeyer

[57] ABSTRACT

Fast and slow channels are attached to a cached peripheral storage system, having a front store and a backing store preferably with a plurality of data storage devices. The peripheral data storage device data transfer rate is not greater than the data rate of the fast channels but greater than the data rate of the slow channels. For data associated with a fast channel, data promotion from the backing store to the front store is designed to encourage read hits while discouraging write hits. For the slow channel, all data goes through the front store. Cache bypassing controls are handled through the LRU (least recently used) replacement algorithm for the slow channels. A common demotion of data from the front store to the backing store is used for all channels. Front store occupancy varies in that buffering for slow channels (data rate change) tends to store and keep full tracks, while caching for fast channels limits data occupancy. For a fast channel, a cache miss results in directly accessing the backing store. The data storage devices are preferably disk data storage devices (DASD) or magnetic tape recorders.

86 Claims, 9 Drawing Figures

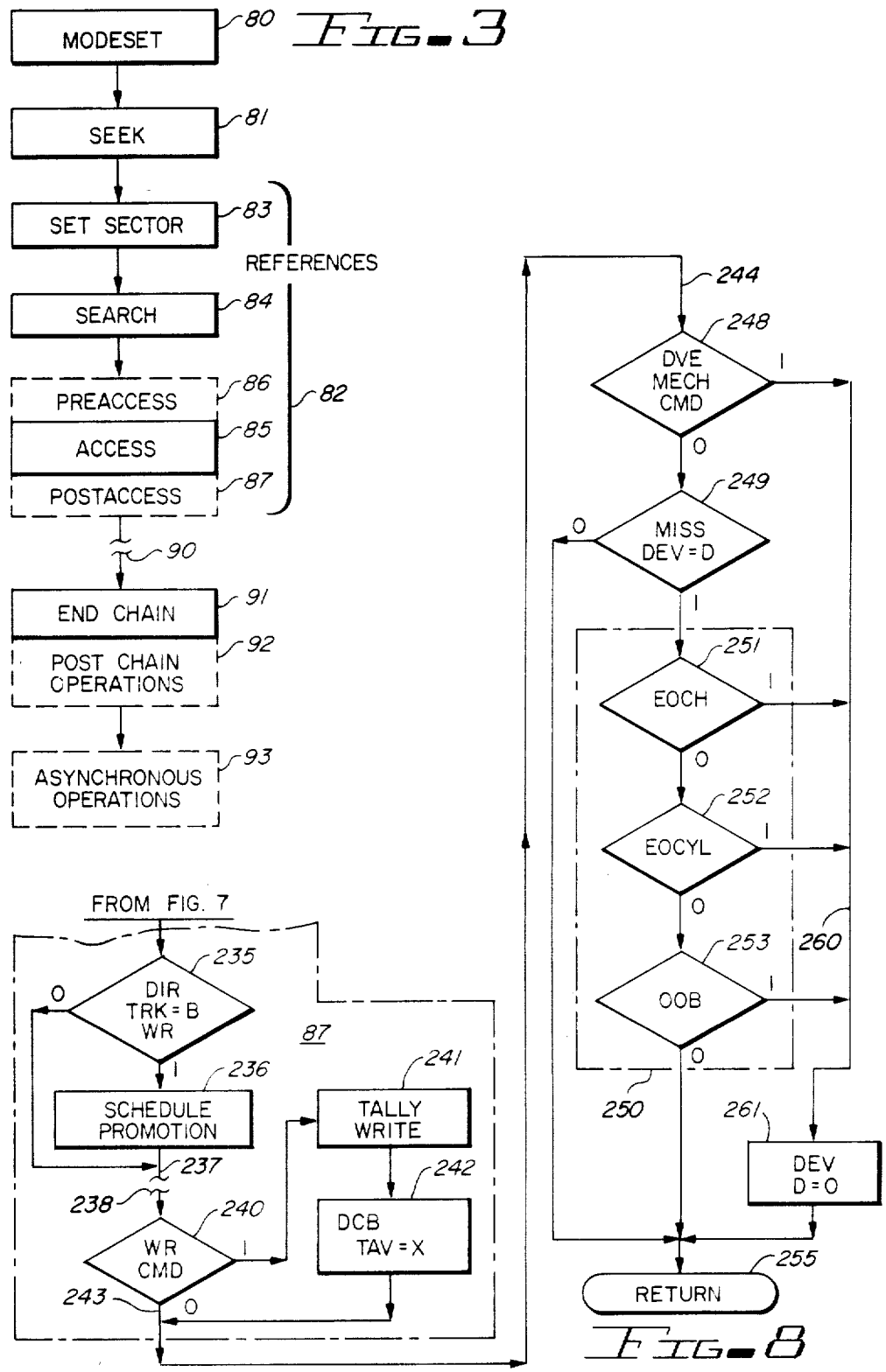

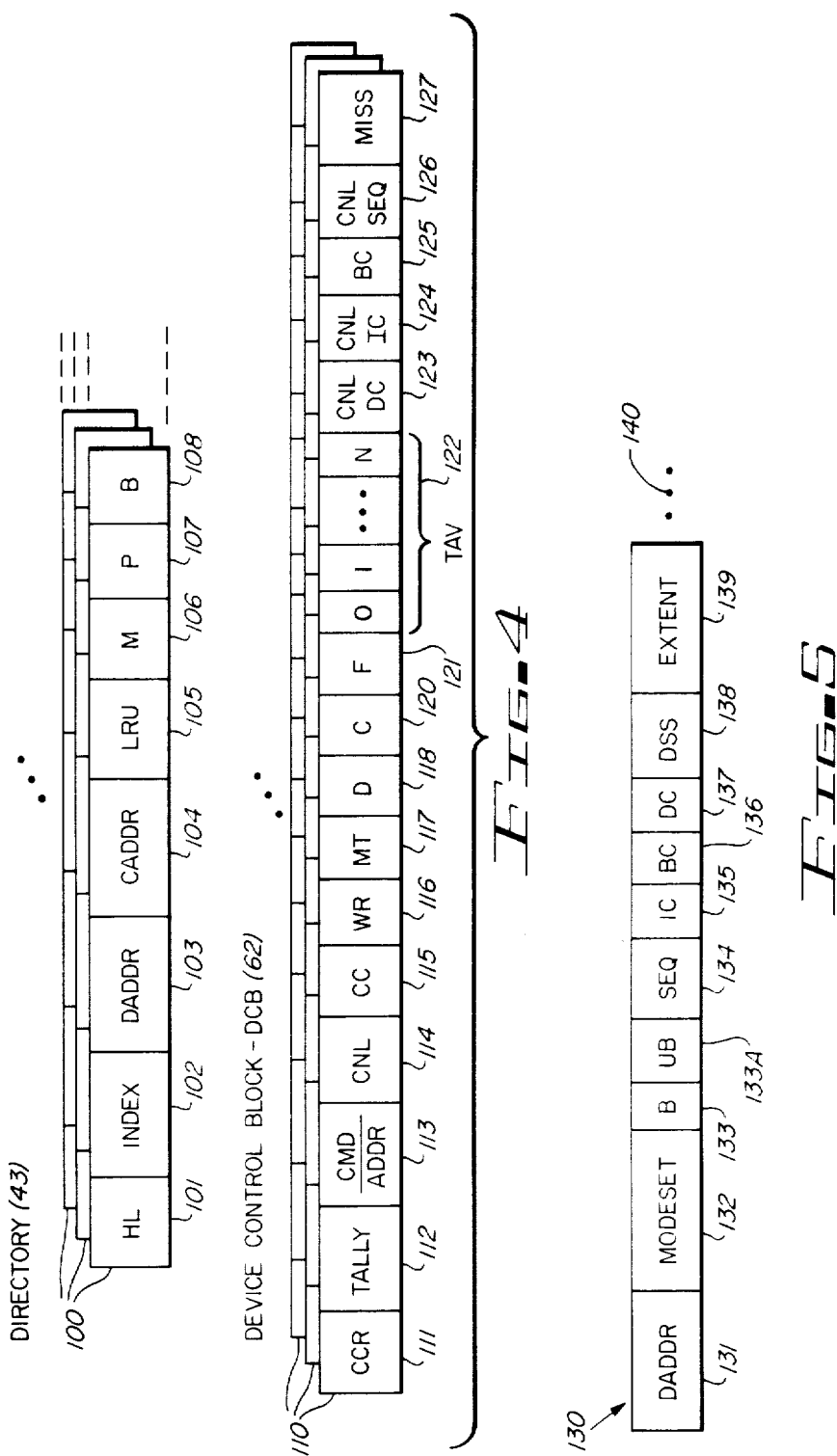

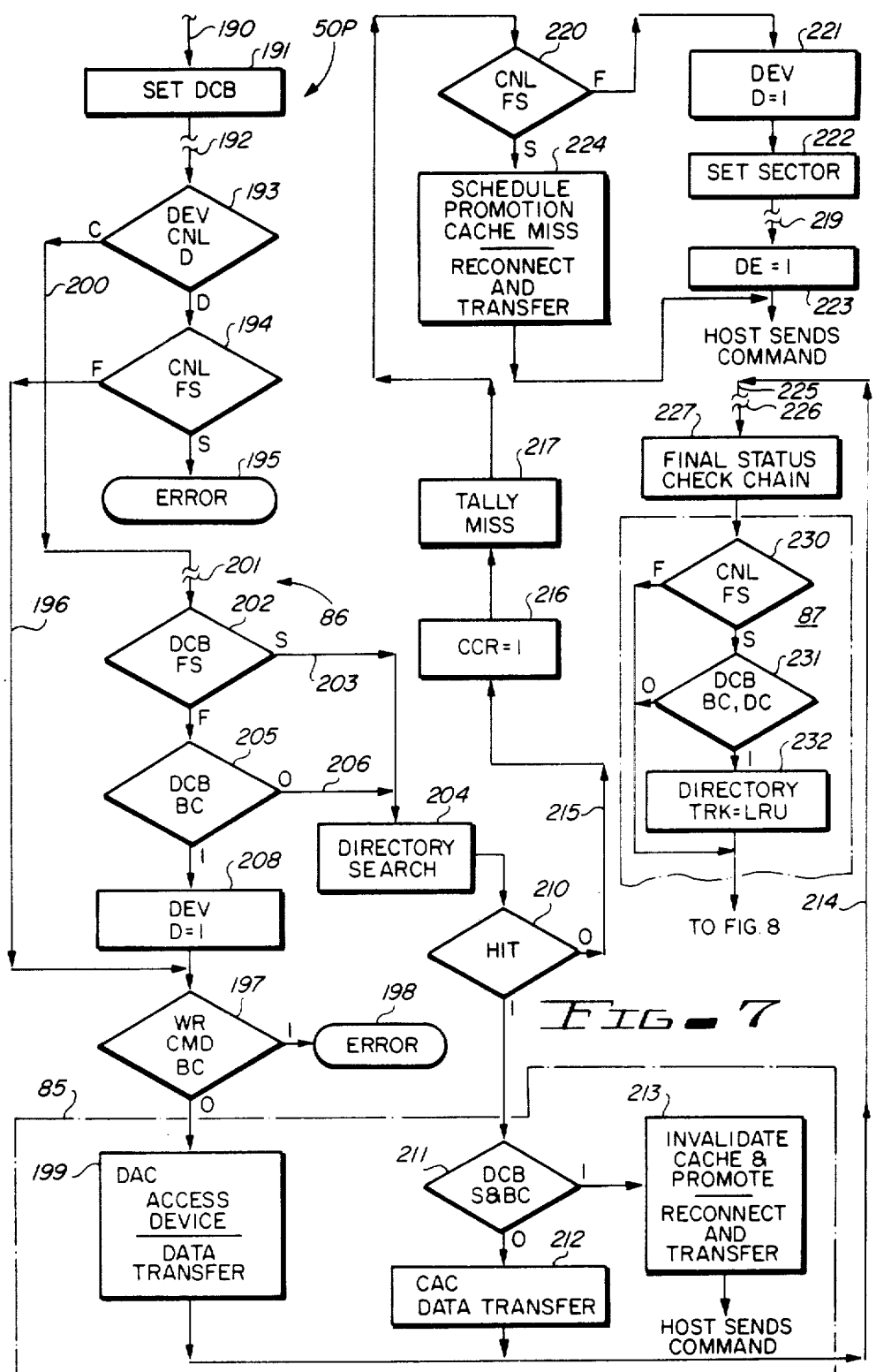

PERIPHERAL STORAGE SYSTEM HAVING MULTIPLE DATA TRANSFER RATES

FIELD OF THE INVENTION

The present invention relates to peripheral storage hierarchies preferably of the type where a random access data cache provides an apparent store for a slower backing store, such as a magnetic storage disk file or a magnetic storage tape file.

BACKGROUND OF THE INVENTION

Data processing has always relied on peripheral storage units such as magnetic tape units and magnetic disk units for storing large amounts of data. Data from such paripheral storage units have been transferred on a demand basis to a main memory of the data processing unit such as shown by Kilburn, et al in U.S. Pat. Nos. 3,217,298 and 3,218,611. In these instances the main memory was used to queue the data awaiting use by the computer programs which required the data. The notion of enhanced performance of a peripheral storage device through the use of data buffers is set forth by Gregory, et al, U.S. Pat. No. 2,960,683. Gregory, et al teach that data can be queued in a first in first out (FIFO) buffer interposed between a peripheral data recorder and a data processing main memory. The effect of the Gregory, et al data buffer is to tend to mask the mechanical delays of the peripheral data recorder from the data processing unit to which it is attached. The desire for high performance and great storage capacity was not satisfied by any of the above solutions.

The Eden, et al, U.S. Pat. No. 3,569,938 shows the concept of a peripheral apparent store characterized by having a high speed storage which operates with the data processing unit and a bulk storage which stores large amounts of data. A control closely associated with the high speed storage and the bulk storage responds to the request from a data processing unit for maintaining data in the high speed storage that is expected to be next used by the data processing unit. This control, called a storage manager, responds to requests from the data processor for paging data from the bulk storage to the high speed storage and in the reverse direction in accordance with predetermined space allocation and replacement rules. In one embodiment the high speed storage was a magnetic core random accessed memory similar to the present day semiconductor memories. The bulk storage can be magnetic disk storage or magnetic tape storage. Also, magnetic disk storage may be a high speed storage for a magnetic tape store. The apparent peripheral store was to provide data and receive data from a plurality of computer connections. The Arnold, et al U.S. Pat. No. 3,670,307 shows a way of improving the operations of a two-level storage hierarchy in that only altered data is moved from the high speed store to the bulk store. Greater flexibility of the apparent store is shown by Amdahl, et al in U.S. Pat. No. 3,670,309 wherein a plurality of ports or host attachment circuits are provided; each port has its own control and has the capability of queuing access requests such that internal operations of the two-level hierarchy is enhanced. Other enhancements of this peripheral storage hierarchy includes placing a data buffer in a channel such as shown in U.S. Pat. No. 3,699,530. This buffer appears to be a first in first out buffer wherein data is queued prior to being assigned to main memory. The variation of a buffer in a channel is shown in U.S. Pat. No. 3,735,360 wherein each processor has its own cache buffer, i.e. rather than a FIFO buffer, a true managed buffer for cache data is provided for each channel. A host attachment for attaching a peripheral storage system to a host is shown in U.S. Pat. No. 3,812,475. Yet another buffered disk storage apparatus is shown in U.S. Pat. No. 3,839,704 how an input/output channel of data processing system accesses data from a disk storage apparatus when a caching buffer is provided. A more elaborate storage hierarchy is shown by Dejohn, et al in U.S. Pat. No. 4,053,752 wherein a plurality of disk storage apparatus cache data from an automatic tape library. Data transfers between a tape library and the caching disk storage apparatus is via a FIFO buffer wherein data is queued in either direction of transfer. A small serializer/deserializer buffer is interposed between the host input/output channel and the caching disk storage apparatus.

The idea of caching in memory also exists between the main memory and a processor. For example, in U.S. Pat. No. 4,189,770 the cache is selectively bypassed on certain operand data transfers. U.S. Pat. No. 4,157,586 shows updating the main memory cache when the back store for main memory is also updated. Transferring data from the cache to the main memory while measuring the rate of accesses to the cache by the processor and then taking time out to do the main memory data transfers shown in U.S. Pat. No. 4,159,517. Caches have been organized in a plurality of caches each having a directory such as shown in U.S. Pat. No. 4,142,234. A copy back control in a multilevel storage hierarchy is shown in U.S. Pat. No. 4,084,231. U.S. Pat. No. 4,020,466 shows copying back to lower levels all changes in upper levels of storage. U.S. Pat. No. 3,588,839 shows moving altered data from a high level in the storage hierarchy to a lower level as soon as possible.

Peripheral systems traditionally attach to various types of computers. Rather than redesign attachments for each type of computer, so-called channels have been developed which couple diverse computers to diverse peripheral systems. With channels, one peripheral system can simultaneously be connected to several different types of computers. It turns out that even with channels, diverse computers have different I/O or channel commands. To accommodate different command sets, the peripheral systems have included diverse circuits. For example, U.S. Pat. No. 3,721,961 shows connecting a peripheral system to diverse computers having diverse command sets. A circuit accommodates the computer diversity by enhancing recovery capabilities of one computer to that of another computer.

Even with all of the above techniques a more optimal performing peripheral storage hierarchy has yet to be devised. Certain improvements in such storage hierarchy internal operations which enhance data integrity as well as providing faster access to the data is still highly desirable. As peripheral devices have increased capability, there is still a requirement that those devices operate with older and probably slower hosts. In particular, input/output or peripheral channel data transfer capacities have substantial data rate variations. For example, a so-called streaming channel can have a capacity for transferring three megabytes per second while older channels may have a capacity of 1.5 megabytes or less per second. Therefore, when new devices are incorporated into a storage hierarchy, it is desired that that hierarchy be capable of attaching not only to the faster channels but also to the slower channels. Such attachments may require substantially diverse data handling techniques for providing an efficient storage hierarchy.

SUMMARY OF THE INVENTION

It is an object of the present invention to provide a peripheral data handling system which automatically adjusts its internal operations in accordance with the relative data transfer capabilities of the attaching channels with respect to the internal data handling capability of the peripheral system.

A path or channel having a data transfer capability of not less than the peripheral system in certain instances is encouraged to directly access the peripheral devices even though caching of data between the host and the device may occur. In a specific aspect, data transfers in a first direction to the devices is encouraged to be direct to the devices, while data transfers from the devices to a using host via a cache is encouraged. For data transfers via data channels having a data transfer rate less than the data transfer capability of the peripheral devices, i.e. slow channels, data caching occurs for all transfers. A selection of the internal operations is on an operation by operation basis and is not data related. Additionally, the using unit sends intent signals to the peripheral system for indicating a desired operative relationship to be established between the cache and the devices. The same intent signals are interpreted by the peripheral system for fast and slow channels in diverse ways for maintaining efficiency and desirable operative connections. In particular, selectively bypassing the cache results in diverse internal controls. Internal controls for space management of the cache are made independent of fast and slow channels except as affected by the transfer of signals between the host and the devices over such diverse channels.

The foregoing and other objects, features, and advantages of the invention will be apparent from the following more particular description of the preferred embodiments of the invention, as illustrated in the accompanying drawings.

DESCRIPTION OF THE FIGURES

FIG. 3 is a generalized flow chart of machine operations for a peripheral data handling system as shown in FIGS. 1 and 2.

FIG. 4 is a diagrammatic showing of a cache directory and a device control block usable with the FIGS. 1 and 2 illustrated system with particular reference to explaining the present invention.

FIG. 5 diagrammatically illustrates a mode set command for providing control to a peripheral data handling system as shown in FIGS. 1 and 2 with particular reference to practicing the present invention using the mode setting intent signals.

FIGS. 7 and 8 are a machine operations chart illustrating operations of the FIGS. 1 and 2 illustrated system during a data transfer.

DETAILED DESCRIPTION

Figure 1:
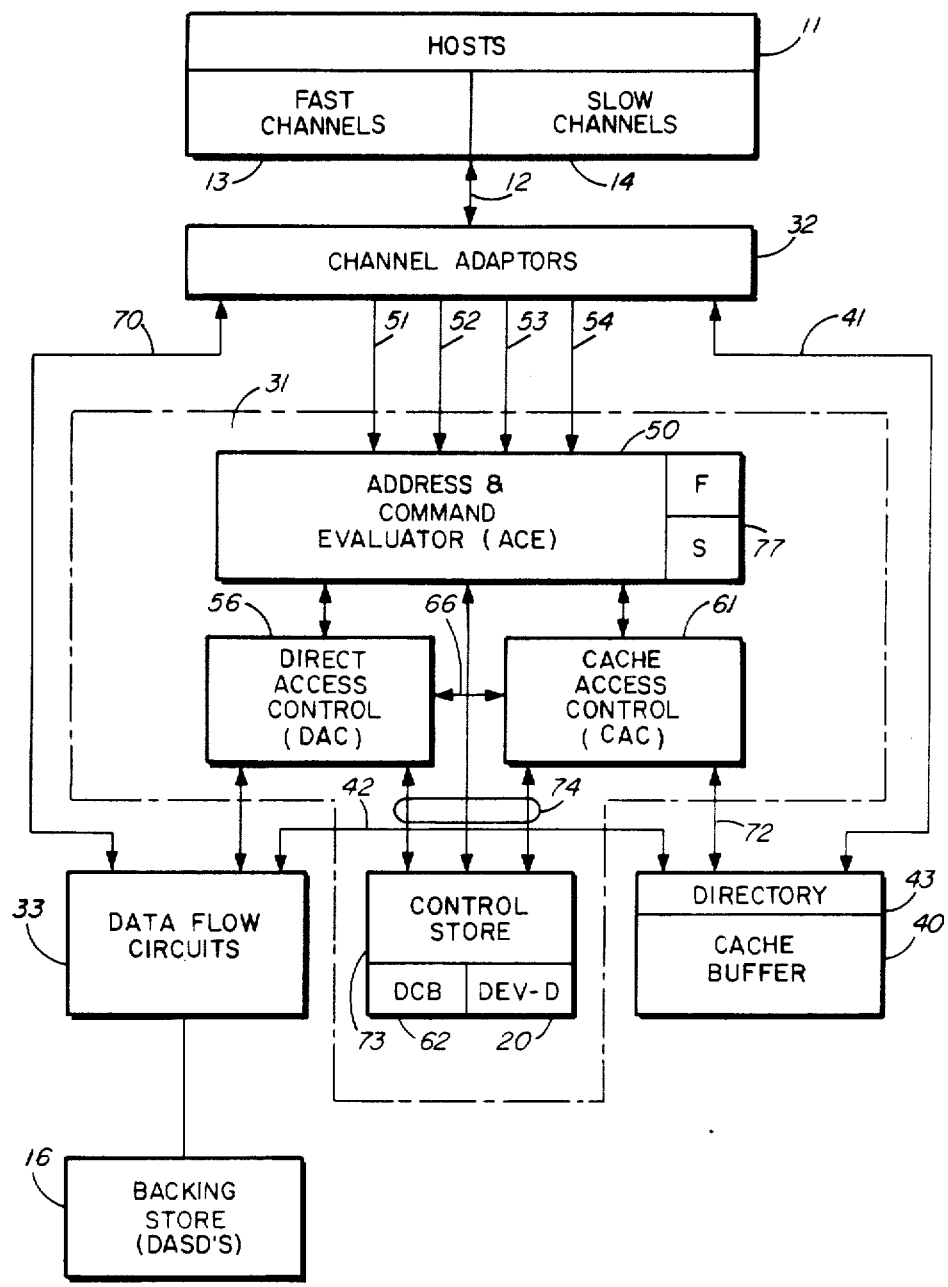
FIG. 1 is a logic block diagram of a peripheral data storage system incorporating the teachings of the present invention with respect to attaching to hosts via relatively fast and relatively slow channels.
Figure 2:
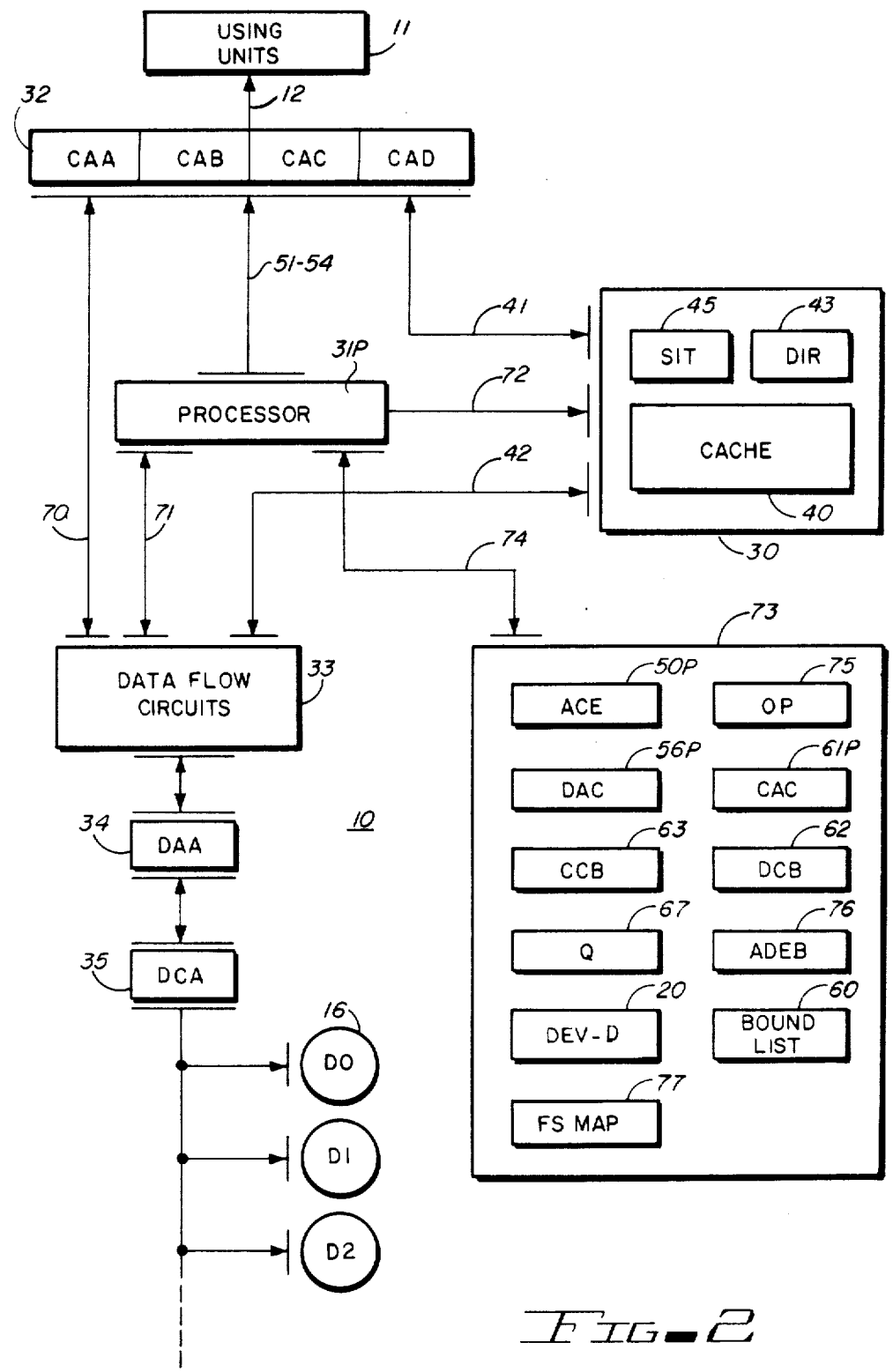
FIG. 2 is a logic block diagram of a preferred embodiment of the present invention which is based upon the FIG. 1 illustration.

Referring now more particularly to the drawing, like numerals indicate like parts and structural features in the various diagrams. As best seen in FIGS. 1 and 2, hierarchical peripheral storage system 10 is attached to hosts (also termed using units) 11 for receiving and supplying data signals for host and storage utilization. In a typical application of storage system 10, hosts 11 consist of central processing units (CPUs). In other variations, hosts 11 can include virtual machines or a set of virtual machines running on a hardware CPU. Hosts 11 may also be multi-processors, uni-processors with attached processors and the like. Storage system 10 for a paging and swapping connection is usually attached to a single host while for general applications it is usually attached to a plurality of hosts 11.

Communications between the paging storage system 10 and hosts 11 occur via a plurality of input/output connections 12 which are constructed in accordance with the input/output peripheral channels of the IBM 370 series of computers available from International Business Machines Corporation, Armonk, N.Y. Such input/output connections, commonly referred to as channels and subchannels, are so well known, their individual description is not necessary. Hosts 11 have I/O channels of varying data transfer rate capabilities. Fast channels 13 enable data transfers between hosts 11 and peripheral system 10 at a given maximal data rate, such as three megabytes or more per second. Slow channels 14 provide for a slower data transfer rate such as 700 kilobytes per second, 1.5 megabytes per second and the like. In accordance with the invention, peripheral system 10 provides efficient data transfers with any of these channels, fast or slow.

Storage system 10 has a lower or backing store consisting of a plurality of direct access storage devices (DASD) 16 and separately enumerated D0, D1, . . . All accessing of data and storage of data by host 11 with respect to peripheral storage system 10 is by addressing DASDs 16. This addressing is achieved by using the known architecture of the input/output connections 12. In some instances, hosts 11 transfer data directly with DASDs 16 while at other times cache 40 of system store 30 is interposed between hosts 11 and DASDs 16. For performance purposes (rapid access to data areas), control 31 manages peripheral system 10 such that data stored in cache 40, which is a selected partial replication of data stored in DASDs 16, is that data most likely to be accessed by hosts 11. Cache 40 is constructed to provide a data transfer rate not less than the data transfer rate of the fastest channel attaching peripheral system 10 to hosts 11.

The data transfer rates of DASDs 16 determine the minimum channel data transfer rate usable with such DASDs. That is, once a data transfer is initiated with a DASD, then the data transfer rate of that DASD determines any nonbuffered data transfer rate for all connected units. Accordingly, for a channel 13, 14 to operate directly through I/O connection 12 with a DASD, that channel must have a data transfer capability of not less than the data transfer rate of the DASD. Also, the main storage (not shown) of hosts 11, or other store that the channels may use to supply or receive data to or from a DASD, must have a capacity to transfer a minimal sized block of data signals.

As new DASDs are developed, the data transfer rates generally increase. It is also desired that these newer high transfer rate DASDs be connected to diverse types of hosts; some of these hosts may have I/O channels with the data transfer rate less than that of the new DASD. Such I/O channels are called slow channels 14; fast channels 13 have a data transfer rate capability of not less than the data transfer rate of a DASD. It is also desired and is provided by the present invention to enable a peripheral data storage system to connect to a diversity of fast and flow channels and yet provide data in cache 40 which is most likely to be used by hosts 11 while selectively permitting direct data transfers between hosts 11, fast channel 13 and DASDs 16. The invention also eases host programming requirements by interpreting certain channel commands in accordance with the data rate capacity relative to the peripheral device data rate of the channel which will handle a given data transfer. Cache 40 provides a rate changing buffer between DASDs 16 and slow channels 14. In accordance with the invention, operations of peripheral system control 31 are modified in accordance with whether a fast channel or a slow channel is currently transferring data to or from peripheral system 10. The operations of the channels can be mixed. For example, data may be supplied by fast channel 13 to peripheral system 10, while slow channel 14 may fetch such data. In a multipathing environment a command can be received over one channel while the data transfer can occur over another channel. The operations of control 31 automatically adjusts in accordance with which channel is currently accessing peripheral system 10 with respect to data to be transferred within a given chain or chains of I/O commands (such chains of command are those chains used in the IBM 370 series computers and the like). In this manner, control 31 and host 11 efficiently cooperate with no particular control structures required except the knowledge by peripheral system 10 of the relative data transfer capability of the I/O channel attaching the peripheral system 10 to hosts 11 and certain host supplied intent signals.

The storage hierarchy of peripheral system 10 includes a system storage 30 of the semiconductor random access type which has a portion 40 designated as a cache for DASDs 16. Control 31 receives peripheral commands from hosts 11 for accessing DASDs 16 or cache 40 based upon DASD 16 addresses. Data is automatically transferred by peripheral system 10 between cache 40 and DASDs 16. These transfers use the same known principles of transfers as between host 11 and DASDs 16. That is, hosts 11 access DASDs 16 in a direct mode (bypass cache) via channel adaptors 32, also individually denominated CAA, CAB, CAC and CAD, then over bus 70 using direct access control 56, data flow circuits 33, device adaptor DAA 34 and device control attachment DCA 35. Received peripheral commands (also referred to as channel command words, CCWs) are interpreted by control 31 for determining the direction of data flow between hosts 11 and DASDs 16 as well as other functions, as is well known for controlling this type of storage apparatus. That is, while hosts 11 provide control via a series of peripheral commands, the control 31 provides data transfers between cache 40 and DASDs 16 by using a plurality of internal command words (ICW) which are structured in a similar manner to the CCWs. Certain efficiencies in data transfers can be provided by altering the ICWs with respect to the CCWs. The ICWs, instead of going through the channel adaptors 32, more from control 31's cache access control CAC 61 (which operates system storage 30) directly over path 66 to direct access control DAC 56. DAC 56 responds to the ICWs in the same way it responds to CCWs; hence, this detail is omitted. Each ICW includes a command byte corresponding to a command byte of a CCW. It should be appreciated that the code permutations for identical commands are the same. Some additional ICW commands may be provided. Each ICW may also have a command modifier byte similar to the command modifier byte of a CCW. Each ICW also includes a chain control bit "CHAIN" which replaces the chaining indication normally provided by hosts 11 to control 31 via channel adaptors 32. (The chaining indication by host 11 is the supplying of a SUPPRESS OUT tag signal at final status time.) Since CAC 61 does not use tag signals, the ICW command modifier byte having a "chain" bit replaces that tag control signal.

Cache 40 transfers data signals through channel adaptors 32 with hosts 11 via bus 41. In a similar manner, data signals are transferred between DASDs 16 through data circuits 33 to cache 40 via bus 42. When simultaneous transfers between cache 40 and hosts 11 or DASDs 16 are not required, buses 41 and 42 are combined into a single bus which is time shared by the data transfers. Accessing cache 40, which can be a relatively large memory (several megabytes), requires CAC 61 to transfer the host supplied device address together with the cylinder and record addresses CHR over bus 72 to a hash circuit (not shown) of system store 30. The hash circuit, which may be microcode implemented, converts the DASD address into a hash class indicator. Since the storage capacity of cache 40 is much less than DASDs 16, the address range of DASDs 16 are concentrated into classes called hash classes for ease of cache access. A scatter index table SIT 45 in systems store 30 has one register for each of the hash classes. The contents of the registers in SIT 45 are address pointers to a directory DIR 43 which contains the address DCHR used to access DASDs 16. When data is stored in cache 40, the DASD 16 DCHR address together with the cache 40 address is stored in a so-called entry of DIR 43. Since a plurality of DASD 16 addresses corresponds to one hash class, a singly-linked hash class list is provided in the entries of DIR 43 such that scanning cache 40 using hashing only requires scanning the entries within a given hash class. Based upon the contents of directory 43, cache 40 is accessed using known techniques. If no related entries are found in directory 43, then a miss occurs requiring CAC 61 to either allocate space in cache 40 for receiving data from hosts 11 or to transfer data between DASDs 16 and cache 40 or host 11 as will be explained. The identification and operational status of each DASD is kept in a respective one of device control block registers of DCB 62.

Control 31 includes the usual portion of those control units that attach system 10 to hosts 11. For example, address and command evaluator ACE 50 communicates with channel adaptors 32 via buses 51, 52, 53 and 54 for receiving command signals from hosts 11 and supplying status signals to hosts 11. ACE 50 evaluates the received CCWs and instructs peripheral system 10 to perform the commanded function as well as indicating the chaining conditions and receiving status signals from the other portions of the peripheral system for relaying to hosts 11. ACE 50 supplies the commands to either DAC 56 or CAC 61, DAC 56 responds to ACE 50 to control data flow circuits 33 as in present day DASD storage systems; CAC 61 searches directory 43 or activates DAC 56 using ICWs.

When CAC 61 detects a cache miss indication from searching the hash class of DIR 43, a request for a data transfer from DASD 16 to cache 40 is supplied over bus 66 to DAC 56. A bus 66 signal alerts DAC 56 to the request and identifies the ICWs. In the preferred microcode embodiment, the transfer over bus 66 is a microcode controlled transfer, as will become apparent. DAC 56 responds to the ICWs in the same manner that it responds to the host CCWs. Upon completion of the CAC 61 requested data transfer, DAC 56 supplies status signals over bus 66 to CAC 61. At that time, cache 40 has data available for host 11. This procedure is always followed for transferring data from a DASD 16 through slow channels 14. For efficiently handling these data transfers, a set of queuing registers 67 queue DASD-related operations requested by CAC 61. In this manner, DAC 56 may not be concerned with the queueing requests to the DASDs but can operate in the same way for either host 11 or for CAC 61. In this manner, DAC 56 cannot only be used in connection with the hierarchy, but can be identically used when cache 40 is by-passed or deactivated.

CAC 61 also includes additional controls, for example, register ADEB 76 contains one entry of directory 43 with which CAC 61 is currently operating. That is, the address of a DASD 16 resulted in a cache hit or a portion of cache 40 was allocated to data to be supplied by host 11; by placing the entry in register ADEB 76, operation of CAC 61 is enhanced. Directory 43 is a part of system storage 30; by placing the active entry in ADEB 76, system storage 30 is free to transfer data over buses 41 and 42 independent of control 31.

FIG. 2 is a block diagram of a preferred embodiment of the invention which employs a programmed microprocessor 31P in control 31. Bus 70 extends from channel adaptors 32 to data circuits 33 and operates in an identical manner as shown in FIG. 1. Buses 41 and 42 respectively extend from channel adaptors 32 and data flow circuits 33 to system storage 30. Buses 41 and 42 may be combined into one bus with data transfers time sharing the single bus. Processor 31P in controlling the data transfers between data flow circuits 33 and system storage 30 provides control signals over bus 71 to circuits 33 and address and sequencing control signals over bus 72 to system storage 30.

Operation of processor 31P is in accordance with microcode programs stored in control store 73 which is preferably writable, although a portion can be writable while another portion containing certain programs can be read-only. Bus 74 couples processor 31P to control store 73. Within control store 73 are programs ACE 50P which implement the functions of address and command evaluator 50, DAC 56P which are programs which implement the functions of direct access control 56, CAC program 61P which implements the functions of cache access control 61 and OP 75 which are other programs necessary for operation of the storage system 10 but which are not necessary to an understanding of the present invention. The registers used by processor 31P to control the system 10 via the programs 50P, 56P and 61P include channel control block CCB 63, (which contains status and control information about a current data transfer with a channel 13, 14), DCB 62, queue registers 67, ADEB 76, SIT 45, bound list 60 (lists data bound or pinned in cache 40) and DEV-D 20 which indicates in given chains of commands which DASDs 16 are to be accessed directly (D=1) and which are to be accessed via cache 40 (D=0). Registers DCB 62 and DEV-D are pertinent to an understanding of the present invention. For an extremely large cache 40, SIT 45 can be stored in system storage 30. To enhance performance, a set of registers for containing a page of SIT 45 can be reserved in control store 73. In a peripheral system employing two storage directors or central units each having a separate control 31, system 10 and data integrity purposes, certain control data structure should be stored in a commonly-accessible storage unit, such as system store 30. These control data structures include directory 43, SIT 45 and bound lists 60.

FIG. 3 is a generalized showing of machine operations useful for understanding the environment in which the present invention is practiced in the FIGS. 1 and 2 illustrated system. Numerals 80-91 refer to peripheral or input/output type of operations within a single chain of peripheral commands. A chain of commands in many computers are indicated by a tag-out signal called "SUPPRESS OUT" from the host to the peripheral system at final status reporting time. Removal of the "SUPPRESS OUT" tag signal at final status time indicates the end of the chain, as at 91. Each chain can be initiated by so-called MODE-SET command at 80. The MODE-SET command supplies control signals to the peripheral system 10 from host 11 indicating to the peripheral system the type of operations to be performed as well as how to interpret some of the commands in the command chain. The MODE-SET command may result in a mode being set that extends over a plurality of chains. Accordingly, not every chain of commands need start with a MODE-SET command. Further, within certain limitations, MODE-SET commands can be interspersed between other commands in a chain of commands for changing modes of operation of the peripheral system. An exemplary MODE-SET command is described later with respect to FIG. 5.

In a DASD environment, a host 11 sends a SEEK command at 81 instructing the peripheral system to adjust the DASD radial head position to accommodate ensuing data transfer commands. An example of the SEEK command is to seek the head to a particular cylinder (all tracks at one radial position) of the storage surfaces of a DASD. Once the cylinder of tracks is accessed by the SEEK command, as at 81; then the rotational position of the recording surface must be set by a SET-SECTOR command at 83. This action can be followed by a SEARCH command at 84 for identifying a record at a given rotational position roughly indicated by the SET-SECTOR command at 83. The SEARCH command at 84 is followed by a data storage area access type command at 85 which can be a READ command or a WRITE command. All of the functions, 83, 84 and 85 are termed references to a track. Such references in combination with the control information of the MODE-SET command at 80 and the type of operations at 85 have a controlling effect, on the internal operation of peripheral system 10, as will become apparent.

In accordance with the invention, the control of accesses to the data storage area, either to cache 40 or to DASDs 16, requires certain pre-access functions to be performed, as at 86, as well as some post-accessing functions at 87. Such accessing functions are described later with respect to the machine operations chart of FIGS. 7 and 8. Numeral 90 indicates that a plurality of commands in a series of reads and writes can occur within a single chain of commands. The end-of-chain is detected at 91. Then, in accordance with the invention, certain post-chain operations occur at 92. Such post-chain operations are illustrated in the machine operations chart of FIG. 9. The term post-chain means the operations are initiated between the ending of one chain and the beginning of a subsequent chain of commands. For reducing the number of asynchronous data transfers in the peripheral system 10, such as between cache 40 and DASD 16, the post-chain operations 92 may be deferred until a next start I/O (SIO) is received from host 12 but before the first command of the succeeding chain is executed. In the alternative, post-chain operations 92 may occur immediately following detection of the end of the chain at 91. Post-chain operations 92 schedule and set up asynchronous operations at 93. Such asynchronous operations include the transfer of data signals from DASD 16 to cache 40 in preparation for a succeeding READ command to be received from host 11, transfer of data from cache 40 to DASD 16 in connection with space management of cache 40 or in response to certain control signals received from host 11, as well as other operations as will become apparent.

FIG. 4 illustrates directory DIR 43 and device control block DCB 62 data structures usable with the present invention. Directory 43 includes a plurality of addressable registers 100 preferably within system electronic random-access storage 30. There is one register 100 for each of the allocatable portions of cache 40. When backing store 16 contains DASD, then the allocatable portions are preferably the extent of storage areas required to store the data contents of one DASD track. In other arrangements, a track of DASD data may be broken into segments or record areas. In those situations where the record areas are fixed lengths, then the allocatable storage space of cache 40 can be set to those record area sizes. In any event, there is one register 100 for each of the allocatable storage areas of cache 40 which also are addressable units. HL's (hash class linkage list) 101, in registers 100, constitute a singly-linked list for identifying a hash class, i.e. an addressing segment of cache 40 based upon the addressing structure of backing store 16. Such hash addressing is known and not detailed for that reason. Index 102 is useful for identifying the directory 43 registers 100 without address hashing through HL 101. DADDR 103 contains the device address of backing store 16 containing the cache stored data; the address includes denomination of which DASD is being addressed, the cylinder address CC, the head or record surface address HH and a record number, if pertinent. CADDR 104 contains the address in cache 40 storing the data represented by the entry in the respective register 100. LRU 105 is a portion of a doubly-linked list having an entry in each of the registers 100 useful in replacement control of cache 40 stored data contents. One end of the doubly-linked list is the least recently used (LRU) allocatable storage area of cache 40 while the other end of the doubly-linked list is the most recently used (MRU) allocatable storage area. Updating the LRU doubly-linked list is known and not described for that reason. M bit 106 indicates whether or not the indicated data contents of cache 40 were modified by data received from a using unit 10 and the corresponding copy in DASD 16 has not yet been updated. This bit corresponds to the laterdescribed track activity vector TAV 122 in DCB 62. P bit 107 indicates that a partial track or record is stored in cache 40. Such partial track may include data from a track beginning at a given sector (rotational position indicated at set sector 83, for example) through the end of the track (index). The beginning or front position of the track is not in cache 40. B bit 108 indicates that the using unit 11, has sent a signal to the storage hierarchy 10 that the data contents of the storage area indicated by the register 100 in cache 40 is to be maintained (bound or pinned) in cache 40. Only a subsequent signal from a using unit 11 for erasing B bit 108 using known peripheral command procedures may change B bit 108. M bit 106 is reset whenever the contents of cache 40 and the backing store 16 with regard to the particular data stored are made equal, such as by demoting data to backing store 16.

The illustrated device control block DCB 62 is stored within programmed processor 51; such as in control store 73. Functions ACE 50, DAC 56 and CAC 61 access DCB 62 in controlling the storage hierarchy. There is one entry or register set 110 for each of the addressable devices 16 in the backing store. A first portion CCR 111 indicates whether or not a channel command retry CCR was sent to host 11 with respect to an operation related to the DASD 16 indicated by the respective register set. Tally 112 contains the later-described tally of write commands for the current chain of commands relating to the addressed DASD. Section 113 contains the current command received from using unit 11 during the current chained peripheral operations associated with the addressed DASD 16. Also, as an alternative, each CCHH search address used is also listed with identification of the last command received in the current chain of commands from using unit 11. CNL (channel) 114 is a bit significant section indicating which channel adaptor 32 received the current command. This control is used to identify fast and slow channels during peripheral operations. Section 115 contains the seek cylinder address CC for the cylinder of tracks currently being accessed. WR 116 indicates whether or not a write operation has occurred in the chain of peripheral operations; the type of write operation is indicated in tally 112. Bit MT 117 indicates whether or not a multitrack (MT) operation occurred in the current chain of commands. That is, a peripheral command may request a data transfer from a plurality of record tracks within a given cylinder CC address. D bit 118 indicates a direct mode access was made to the device during the chained peripheral operation, such as caused by a cache miss. That is, for a fast channel 13 if cache 40 does not have space allocated (cache miss) to service a data access request (read or write), then within the cylinder CC data direct accesses to backing store 16 satisfy the current request as well as all subsequent accesses within the cylinder and within the chained peripheral operation. C bit 120 indicates that cache 40 was accessed or intended to be accessed (cache operating mode as opposed to a cache bypassing mode, such as taught in U.S. Pat. No. 4,075,686). When both bits D 118 and C 120 are set to unity, a cache miss is indicated and recorded in miss bit 127. F bit 121 indicates that the channel adaptor 32 currently active is connected to a fast channel 13; with F=0 a slow channel 14 is indicated. Track activity vector TAV 122 contains one bit position for each record track in a cylinder set of such tracks. The bits indicate which tracks were written into during the current command chain. So long as CC 115 is constant, the TAV 122 contains a bit pattern showing which tracks in DASD 16 received data being written to the storage hierarchy. TAV 122 is updated by each write command execution in a usual manner. CNL DC 123 is a field having one bit for each of the channel adaptors 32. The bits may persist between a sequence of chains. For a fast channel, DC indicates deactivation of caching for the addressed DASD 16 with respect to a given channel as represented by a channel adaptor 32. Data stored in a DASD 16 will not be promoted to cache 40 when the attaching host 11 has indicated that caching should be deactivated (DC=1) for that DASD 16. In the alternative, a signal from an attaching host 11 that caching for the device should be deactivated can apply to all channel adaptors, i.e. cache 40 will be unavailable for all references to the address DASD. In the latter instance, a channel mask relating to deactivation of caching is not needed. Deactivation of caching for a slow channel 14 results in all references in cache 40 for the slow channel being made least recently used, i.e. first replaced.

In a similar manner, CNL IC 124 indicates that caching is inhibited for the DASD 16. That is, data access references to DASD 16 made by the current command chain result in no tracks being good candidates for promotion to cache 40. Such host system 11 references are either a stand alone reference to the cache or in a group of references which cannot take full advantage of cache. For example, reference patterns which do not benefit from caching are those access references spread randomly across a large set of tracks, i.e. the peripheral system 10 cannot predict which data to promote to cache 40 for enhancing performance. Also, when command chains have been optimized to DASD operating characteristics and there are large units of data being transferred, as an example a memory dump which results in transferring a plurality of tracks in a fast sequence, may not benefit from caching. Where references to the DASD are series of recording or write operations during inhibit cache loading, following completion of such a command chain to which the IC attribute applies, no data from DASD 16, are promoted to cache 40 except to make currently resident data stored in cache 40 consistent with DASD updates performed by the command chain. For example, any data bound to the cache by the B bit 108 will be updated such that there is congruence of data between the cache 40 copies and the DASD 16 copies. If the current command chain modified only the last track referenced and that track image is inconsistent (noncongruent) with the current contents of DASD, that track image in cache 40 is updated from DASD 16 except for the two following specific instances; sequential data is being processed or multiple writing operations occurred in the current chain of commands.

Any copies of data which have become incongruent with the DASD 16 data copies as a result of executing command chains are demoted from cache 40. It should be noted that the IC attribute is a property of the current reference pattern and not a property of the data, per se. Therefore, any access involving the IC attribute to a DASD track which does have an image in cache is not an indication that that particular data should be demoted from cache; i.e. some other references may have caused the data image to be promoted into cache 40. The IC attribute also does not indicate that earlier data promotions were incorrect. Accordingly, the cache 40 copy of the data should continue to reside in cache subject to the replacement algorithm, as if the IC attribute reference had not occurred. For this reason, the IC attribute with respect to an image of data in cache does not cause that data's position in the LRU list to be adjusted. All of the above relates to fast channel 13 operations. For a slow channel 14, any data arriving into cache 40 during execution of a command chain with an IC attribute active are identified at the bottom of the LRU list making such data the more likely candidates for replacement. It should be noted that data in the cache 40 related to the addressed device 16 but not placed in cache 40 as a result of the current references to the addressed DASD are not subject to these controls.

BC bit 125 indicates that the cache should be bypassed for the current command chain. When BC is specified in a mode set command, host 11 during the current command chain works directly with DASD 16 as though there were no cache 40 in existence. The cache directory 43 is not searched; a reference to a track in DASD which happens to have a copy of its data in cache 40 does not result in any adjustment to the replacement algorithm LRU list ordering. In this mode, all write commands are preferably inhibited in any command chain subject to an active BC attribute. The reason for this inhibition is for data integrity. During a BC attribute, a write command could cause data to be recorded into a DASD 16 without updating cache 40. As a result there will be noncongruent copies of data in the storage hierarchy resulting in a loss of data integrity. The above applies for fast channel 13 operation. For a slow channel 14, which always requires the use of cache 40, all data subject to the bypass cache attribute results in the data being identified as least recently used data, making the data most likely candidates for replacement. From the above, it can be seen that for fast channel 13 operations, the controls relating to certain usages of cache have a given effect, i.e. actually intend to avoid usage of the cache. When the storage hierarchy is attached to a slow channel 14, then such cache usage attributes result in associated data being the least recently used, i.e. the best candidate for replacement.

CNL SEQ field 126 is a bit significant field indicating which channel adaptor 32 is to transfer sequential data within the current chain of commands (the bit is reset each time a chain of commands is terminated). The effect of the sequential data control on the operation with a fast channel 13 and a slow channel 14 within a chain of commands is described later. Both of the data structures shown in FIG. 4 will contain other controls not pertinent to the understanding of the present invention but which may be desirable for operating a storage hierarchy.

FIG. 5 diagrammatically illustrates a mode-setting command, such as received in a chain of commands as a first command, as at 80 in FIG. 3. It is to be understood that such mode-setting commands can be received at any time within a chain of commands. As will become apparent, the effect on system 10 of such a mode-setting command varies depending upon its location within a chain of commands. The actual mode-set command structure 130 includes a DADDR field 131 which identifies the DASD 16 being addressed. This field is the first byte sent accross I/O connection 12. Such DADDR signals are supplied when the "ADDRESS OUT" tag signal is being supplied by host 11. Such signals form a part of the 360-370 input/output interface and are not shown for that reason. Command byte 132 identifies the command as a mode setting command. A plurality of bits 133–138 are contained in the command modifier byte for storage in peripheral system 10 and usage, to alter system 10's modes of operation. These bits being zero is a normal mode of operation. Any bit being set to unity indicates that a change in system 10 operation is to occur as set forth below. B bit 133 being set to unity indicates that all of the data defined in extent field 139 is to be bound or pinned to cache 40. Execution of the mode-setting command results in the data identified by extent field 139 to be placed into bound list 60 (FIG. 2) contained in control store 73 (in system store 30 for a two control unit embodiment) as well as setting the bit 108 of directory 43 (FIG. 4). As a part of executing the mode set command, that data is promoted to cache 40 from DASD 16. Bit 133A indicates that the data defined in extent field 139 are to be unbound (UB) from cache 40. Bit 108 is reset to indicate the unbind command. Bits 133 and 133A are never simultaneously set; if both are reset, no bind or unbind action occurs. SEQ bit 134 indicates that the next several data transfers will be largely sequential data. This bit results in CNL SEQ field 126 being altered for the duration of the current chain of commands in accordance with the channel adaptor through which the current mode-setting command was received. IC bit 135 sets the corresponding bit in CNL IC 124 of DCB 62 in FIG. 4. In a similar manner, bits BC 136 and DC 137 respectively result in bits 125 and 123 being set to the active condition for the respective channel adaptors. DSS 138 indicates that system store 30, including cache 40, should be deactivated. It should be noted that using diagnostic procedures, peripheral system 10 can deactivate system storage 30 to prevent loss of data integrity. Numeral 140 indicates other fields may be used in connection with mode-setting commands, such as establishing upper and lower bounds of access, setting file masks for controlling writing into DASD 16 and the like; all of such mode-setting controls are not pertinent to an understanding of the present invention.

Figure 6:
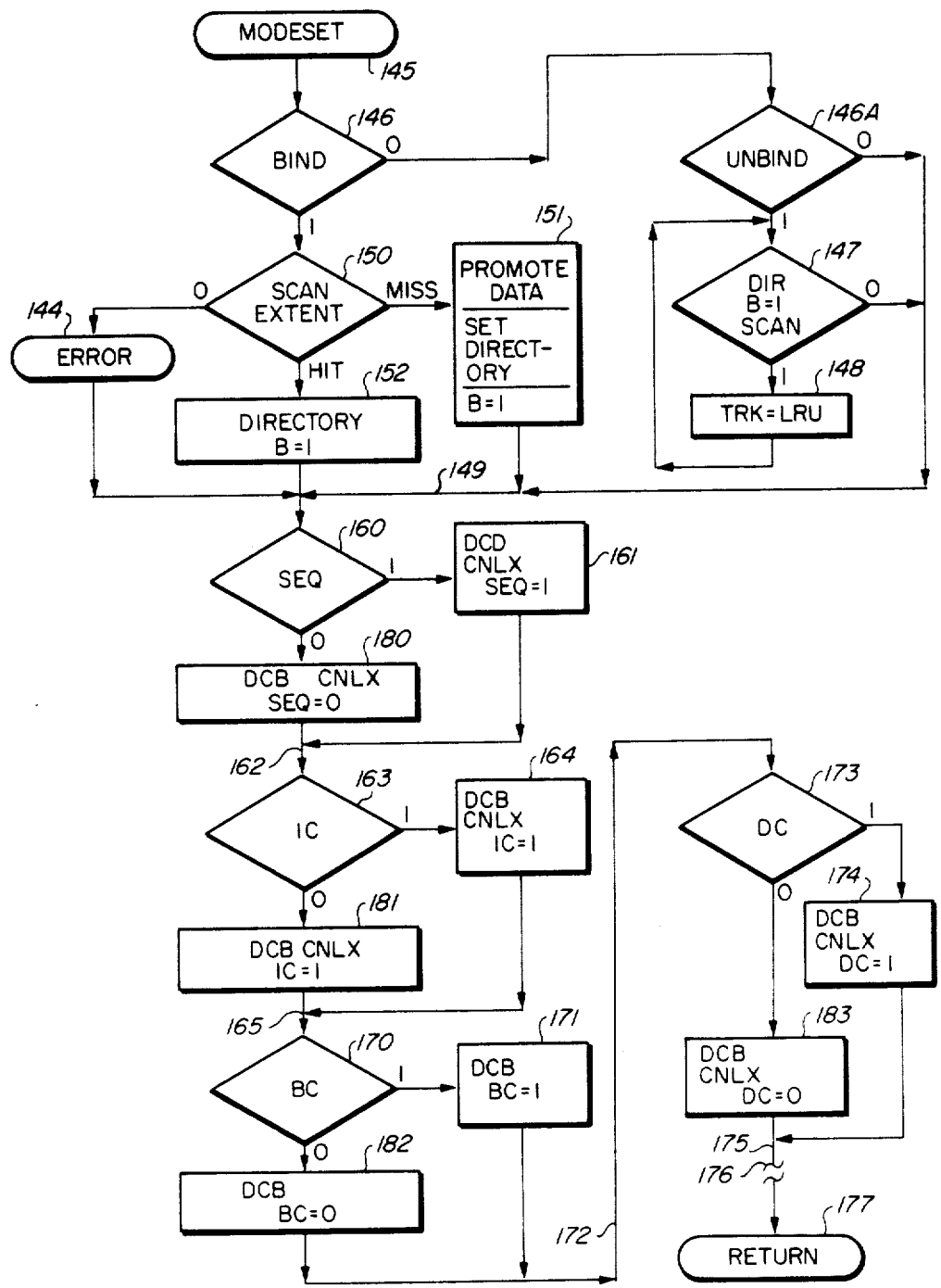
FIG. 6 is a machine operations chart illustrating execution of a mode set command, as shown in FIG. 5, by the FIGS. 1 and 2 illustrated system.

A mode-setting command supplied by a host 11 is received by peripheral system 10 in the usual manner through channel adapter 32. ACE 50 receives the mode-setting command via one of the buses 51–54. The command is decoded and evaluated using known techniques. When ACE 50 recognizes a command as a mode-setting command, it forwards the received command and the command modifier data to CAC 61P for execution as shown in the machine operations chart of FIG. 6. CAC 61P, a program in processor 31P, receives the mode setting command at 145. At 146, B bit 133 (FIG. 5) is examined. B bit 133 will indicate to peripheral system 10 that data defined in the extent field 139 is to be bound to cache 40. If B bit 133 is zero, then it is possible that data currently bound to cache 40 is to be unbound. At 146A, UB bit 133A is examined. If it is zero, no changes will be made to bound status, processor 31P proceeds to logic path 149. For an unbind indicated at 133A. at 147, 148 processor 31P examines directory 43 to unbind the data indicated in extent field 139. At 147, directory 43 is examined (using extent field 139) to address one or more tracks indicated in the extent field for examining the respective B bits 108 (FIG. 4) indicating what data is currently bound to directory 43. All of the data in directory 43 identified by the scan at 147 are added to the LRU list at 148, i.e. all of the DASD tracks having data in cache 40 are made least recently used (TRK=LRU). This act is achieved by adding the tracks indicated in extent field 139 to the LRU input of the doubly-linked list in directory 43 occurring in section 105 (FIG. 4). If there are no data bound to directory 43, step 148 is omitted allowing processor 31P (CAC 61) to follow logic path 149 to then execute later described steps.

When B bit 133 is unity, then at 150, extent field 139 is scanned. If the extent field is zero, an error condition is logged at 144 for reporting to host 11. Optionally, an error exit from execution of the mode-setting command may be taken. Returning to step 150, based upon the contents of extent field 139, directory 43 is scanned for each track having an entry in directory 43 which is also identified in extent 139. Processor 31P accesses directory 43 at 152 to set the B bits 108 of the respective directory entries identifying the data signified in extent field 139 for binding that data to directory 43. For each miss, i.e. the data desired to be bound to cache 40 that is not currently resident in cache 40, processor 31P at 151 schedules the promotion of data from the DASD 16 addressed by the mode setting command such that directory 43 can have its B bits 108 set to unity for binding the data promoted to cache 40. Preferably such data promotions can occur before completion of a mode setting command which ensures to the host 11 that the desired bound data is in cache 40 prior to completion of the command. In the alternative, the data promotion may be scheduled and promoted asynchronously upon completion of the current chain of commands in which the mode setting command resides. Accordingly, step 151 represents not only scheduling the data to be promoted, but also the actual transfer of data signals from the addressed DASD 16 to cache 40.

Sequential data indicating bit 134 of the received mode-setting command is examined at 160. When sequential data is indicated for a given chain of commands, processor 31P at 161 accesses DCB 62 for setting the appropriate sequential indicator 126 for the channel adaptor over which the mode setting command was received. As an example, the illustrated peripheral system 10 has four channel adaptors CAA through CAD. In this instance, field 126 has four bits, one bit for each of the channel adaptors. The CNL field 114 was previously filled by ACE 50 upon receipt of the command from the respective channel adapter CAA-CAD as indicated by which of the buses 51-54 carried the command, for example. Logic path 162 leads processor 31P from the sequential analysis to examine bit IC 135 which selectively instructs peripheral system 10 to inhibit cache load. When this bit is active, processor 31P at 164 accesses DCB 62 field 124 to set the IC bit that corresponds to the commandreceiving channel adaptor (which also represents the channel and host which sent the mode setting command). Logic path 165 leads processor 31P from the inhibit cache load analysis to examine BC bit 136 to determine whether or not cache 40 should be bypassed during the current command chain. When BC is equal to unity, processor 31P at 171 accesses DCB bit BC 125 for setting it to unity. Logic path 172 is then followed to examine DC bit 137 at 173. When the cache 40 is to be disabled for the addressed device, processor 31P at 174 accesses DCB 62 field CNL DC 123 for setting the DC bit corresponding to the channel sending the command. The DC bits persist between successive command chains. In the three fields, 123, 124 and 126, the channel source of the mode-setting command is indicated. These bits are maintained within one chain of commands. In this manner, multiplexed operations of peripheral system 10 are provided. For the respective bits 133–137 being zero, the corresponding fields in DCB 62 are reset to zero as indicated in steps 180, 181, 182 and 183, respectively. In certain circumstances where a plurality of mode setting commands can be received within a given chain of commands, certain of the resetting functions may be inhibited. For example, the sequential bit may only be reset at the beginning of the chain of command. In a similar manner, bypass cache can only be reset at the beginning of a chain. This limitation can be used for providing system integrity by requiring the host to generate a new chain of commands for each major change in operations of peripheral system 10.

Following the memorization of the intent signals 133–137, processor 31P follows logic path 175 to perform other miscellaneous mode setting functions at 176. Such miscellaneous mode setting functions may include setting file masks, limiting addressing extent of a particular chain of commands and the like. ACE 50 is returned to at 177 for reporting a successful completion of the mode setting command to the sending host 11.

The FIG. 7 including accommodation of operational differences for fast and slow channels shows machine operations chart accessing a record and corresponds to steps 85, 86, 87 of FIG. 3. It is to be understood that for the FIG. 3 illustrated set sector 83 and search 84 steps, similar fast-slow channel accommodation occurs for ensuring that functions to be performed in the chain of commands for the respective fast or slow channels, 13, 14 are appropriate. Since accessing data performs all of the functions with regard to fast and slow channels, only data access accommodations are detailed. The received data access command can be either a read or write type. In some embodiments, a separate machine operation chart may be used for all read operations as well as for all write operations. For ease of explanation and since the functions are appropriately interrelated for read or write, a single machine operations chart is shown as a best mode of implementing the invention in that a minimal number of microcode words will be used.

Processor 31P upon receiving the command performs several functions in ACE 50P, as represented by numeral 190. In the processing of a received command by ACE 50P, processor 31P accesses DCB 62 for setting the register set 110 in accordance with the received command. This includes inserting the command and address information in section 113, identifying which channel adaptor 32 (viz channel) supplied the command in section 114 set MT 117 for any multitrack command (multiple track access is enabled), set F at 121 in accordance with FS map 77 and CNL 114. These same steps are performed in executing the earlier described mode setting command.

Upon completion of the ACE 50P portion of command processing, CAC 61P is activated for to perform the FIG. 7 machine operations, these operations include some preliminary steps 192 not pertinent to the understanding of the present invention. At 193 processor 31P, acting through CAC 61P, examines DEV-D 20 of control store 73 (FIG. 2) to determine if a previous command had set the addressed device to the direct mode D or if the addressed device is in the caching mode C for the channel adaptor 32 which received the current data access command. For a direct mode indication processor 31P at 194 examines F bit 121 to see whether the channel over which the present command was transmitted is a fast or a slow channel. For a slow channel in a direct mode the operation cannot ensue in the direct mode to DASD because the channel cannot receive data from the DASD 16 fast enough. For a write operation, the slow channel cannot supply information signals fast enough to satisfy the constant data rate requirements of DASD 16. Therefore, an error, probably an error in ACE 50P, is indicated at 195. When the host indicates direct mode (bypass cache) for a slow channel, the cache 40 is still used as later described. For a fast channel in the direct mode, processor 31P proceeds through logic path 196 to step 197 to determine whether or not BC 125 was set by a previous mode setting command. For BC 125 active and the command signified in section 113 of DCB 62 being a write command, an error may be indicated at 198. Remember, that for a bypass cache condition, writing to DASD 16 to the exclusion of cache 40 may create a data integrity problem in that cache 40 may have data relating to the write operation. The error prevents another host from accessing cache 40 through an alternate channel 32 and thereby get data that is not currently accurate. Writing to DASD can be permitted provided the corresponding data in cache 40 is appropriately invalidated or updated. From step 197, for BC=0 or not a write command, a data access occurs in accordance with step 85. For a direct access to DASD 16, at 199, DAC 56P is activated from CAC 61P to access the addressed DASD 16 and transfer data using known DASD data transfer techniques. The direct data transfer path includes data flow circuits 33, bus 70 and the activating channel adaptor 32. Upon completion of that data transfer, processor 31P follows logic path 212 to post-command processing 87, as later described.

Returning to step 193 of pre-command processing 86 in CAC 61P, when caching is indicated for the addressed DASD, processor 31P follows logic path 200 to perform some preliminary cache-examining steps at 201. Such steps for verifying status of cache 40 are not pertinent to an understanding of the present invention. At 202 F bit 121 of DCB 62 is examined to determine whether a fast or a slow channel supplied the present command. For a slow channel, logic path 203 leads processor 31P to search directory 43 at 204. Bypassing cache 40 from a slow channel results in data in cache 40 being invalidated and the copy of data stored in DASD being promoted from DASD to cache, as later described for caching operations. For a fast channel indicated at 202, processor 31P at 205 examines DCB 62 bit BC 125 to determine whether or not caching is bypassed for the current command chain. When caching is not bypassed, logic path 206 leads processor 31P to search directory 43 at step 204. For a bypassing cache indication, processor 31P sets DEV D 20 for the addressed DASD 16 to unity at step 208. From step 208, processor 31P goes through step 197 to direct data access step 199 of data access 85.

For a caching operation, from logic paths 203, 206, the directory search at 204 results in either a cache hit or miss. The directory search, remember, is based upon the DASD 16 address including device, cylinder number and track number using the above-referred to hashing technique. Based upon the results of that directory search, a known technique, processor 31P at 210 examines for a hit or miss. For a cache hit, processor 31P, at 211, examines DCB bypass cache bit 125 and section 114 for a slow channel 14. For the conditions not being met, the data transfer occurs at 212 under CAC 61P supervision by transferring data between cache 40 and channel adaptor 32. Such data transfer can be to cache 40 or from cache 40. For the conditions being met, remember the slow channels must use cache and that bypass cache BC indicates the host wants the DASD copy of the data. Therefore, at 213 the copy of data in cache is invalidated, a channel command retry CCR is sent to the host and the copy of data in DASD is promoted to cache 40. The CCR is satisfied by system 10 reconnecting to host 11 and effecting the requested data transfer in accordance with the machine operations shown in FIG. 7. Then host 11 can send additional commands. Also, upon completion of steps 199 or 212 in data access 85, logic path 214 leads processor 31P to later-described post-command processing 87.

For a cache miss at 210, processor 31P follows logic path 215 to send a channel command retry CCR to host 11 at 216. Such CCR is supplied also to device control block 62 section 111 such that the next received command that matches the command listed in section 113 is identified as a CCR response by host 11. The cache miss is tallied in tally section 112 for the addressed DASD 16 at 217. At 220, F bit 121 is again examined for determining whether a fast or slow channel supplied the current command. For a fast channel, on a cache miss it is desired to access DASD 16 directly to the exclusion of cache 40.

Accordingly, at 221 DEV D for the addressed DASD is set to unity indicating a direct access. The next time a data access command is supplied to peripheral system in response to the CCR a direct access is indicated via steps 193, 194 and 197. To prepare for the upcoming retransmittal of a data access command, peripheral system 10 at 222 supplies a set sector command to DASD 16 for establishing a DASD rotational relationship. At 219, intervening and unrelated machine operations may occur. When the conditions for SET SECTOR are satisfied, at 223 a device end (DE) is supplied to host 11 to signify that the data access command can be retransmitted. When the data access command is retransmitted, it is again decoded by processor 31P acting through ACE 50P. Then at 193 the direct access is detected and the actual access occurs through step 199. Step 199 is repeated for all subsequent data access commands for the addressed DASD within the current command chain for all tracks in the same cylinder of tracks.

On the other hand, for a slow channel, cache 40 must still be used. Accordingly, at 224 processor 31P schedules promotion of data to cache 40 from the addressed DASD 16. Upon completion of that asynchronous promotion of data to cache 40, the CCR 111 field of DCB 62 (which will be transferred to other control data structures not pertinent to an understanding of the present invention) will signify to processor 31P that a device end should be sent to host 11, as at 223. Host 11 then resubmits the command resulting in reexecution of FIG. 7 but with a hit occurring at step 210. This action is signified in step 224 as reconnect and transfer. At this point, all of the functions related to data access have been completed. Processor 31P then proceeds through logic path 225 from logic path 214 to perform some nonpertinent functions at 226, at 227 checks chaining and reports final status to the host 11 in accordance with known command completion procedures.

Post-command processing 87 begins at 230 where F bit 121 is again checked for a fast or slow channel. When the command was received over a slow channel, at 231 processor 31P examines DCB 62 fields DC 123, BC 125 and IC 124 to determine whether or not the DASD addressed data contained in cache 40 should be made LRU. In a preferred form of implementing the present invention, such data is identified as being less recently used, than presently indicated but not the least recently used data. For example, in a thousand segment LRU list, it could be adjusted one hundred segments toward the LRU end of the list or a given number of entries (e.g. 15 entries) from the LRU end of the list. That is, whenever there is a bypass cache or inhibit cache indication (caching is deactivated for an identified channel and device) from host 11, the data that was referenced is still stored in cache 40 and should be removed from cache. In the event that there was a hit at 210 (a miss indicates the data is not in cache 40), directory 43 is accessed at 232 such that the addressed track data stored in cache is made less recently used cache data by adjusting the doubly-linked LRU list of section 105. Otherwise, from step 230 or 231, as shown in FIG. 8 processor 31P examines directory 43 B bit 108 at 235 to determine if the addressed data stored in cache 40 is bound. If the data is bound and a write operation occurred as indicated by field 116 of DCB 62 as set by processor 31P in step 211 with the DASD and cache data copies still being non-congruent data from DASD 16 is promoted to cache 40 at 236 for making the cache copy congruent with DASD. This action does not occur for a slow channel. That is, the data that is stored in the retentive backing store is maintained as the congruent copy in cache 40. However, for data integrity purposes when data is bound to cache 40, that data is treated as being identical to DASD 16 data such that cache 40 and DASD 16 data contents are kept congruent. From steps 235 or 236, processor 31P follows logic path 237 to perform some nonpertinent functions at 238. Then at 240, WR bit 116 is again examined. If a write occurred in the current command chain, the write is tallied at 241. The tally includes identification of a format write and the like. At 242, DCB 62 is examined for updating the track activity vector 122.

Programmed processor 31P then proceeds over logic path 244. A fourth check at 249 is for a received command which is a device-related command. This type of command includes the RECALIBRATE command as used on present day DASD. When the checks are performed after command execution, step 248 occurs in command preprocessing, such as by ACE 50P steps 192 of FIG. 7. Then it determines at 249 whether or not there was a change in operations of a fast channel due to a cache miss (DCB 62; MISS 127) and DEV D=1 (number 20, FIG. 1). If a miss resulted in direct access to DASD 16 (fast channel 13), such direct access is limited to a cylinder of tracks, a chain of commands or address extent as checked by check steps 250. These check steps may be performed for each command upon sending final status to using unit 11 or upon receiving a next peripheral command but before execution of such next peripheral command. At 251 processor 31P checks for end of the chain (EOCH) which was detected by the absence of the SUPRESS OUT tag signals at final status time. The second check at 252 is for the end of the cylinder (EOCYL); that is all of the set of tracks within a cylinder have a predetermined address space, tracks 1 through 17, for example. Depending upon the addressing increment direction, i.e. increasing or decreasing track addresses, upon completion of an access to a track, the next track can be in an adjacent cylinder or within the same cylinder. If the next track to be accessed is expected to be in an adjacent cylinder, then at 261 programmed processor 31P resets DEV D 20 to zero to reinstitute caching. The third check at 253 is for out of bounds (OOB). It is common practice in present day DASD peripheral systems to have a define extent (mode setting) command received from a using unit 10. A define extent command establishes a range of addresses which defines bounds of permitted access. Accordingly, if programmed processor 31P in processing the peripheral command indicates that the address being processed is at the boundary of the defined extent; then an out of bounds condition occurs, i.e. the next desired access will be outside of the previously defined extent, i.e. a change in operation in that access to the data area will be denied if attempted without an intervening DEFINE EXTENT command that extends the extent.

If all of the steps 248-253 result in no branch being taken, then programmed processor 31P returns to ACE 50P via return 255 for receiving another command and to schedule asynchronous operations within peripheral system 10. If any one of the conditions set forth for step 250 are met, then programmed processor 31P follows logic path 260 to reset DEV D 20 to the C (caching state) for the addressed DASD 16. Following step 261 or from step 249 (with no cache miss or operations with a slow channel), processor 31P returns to ACE 50P via return 255.

Figure 9:
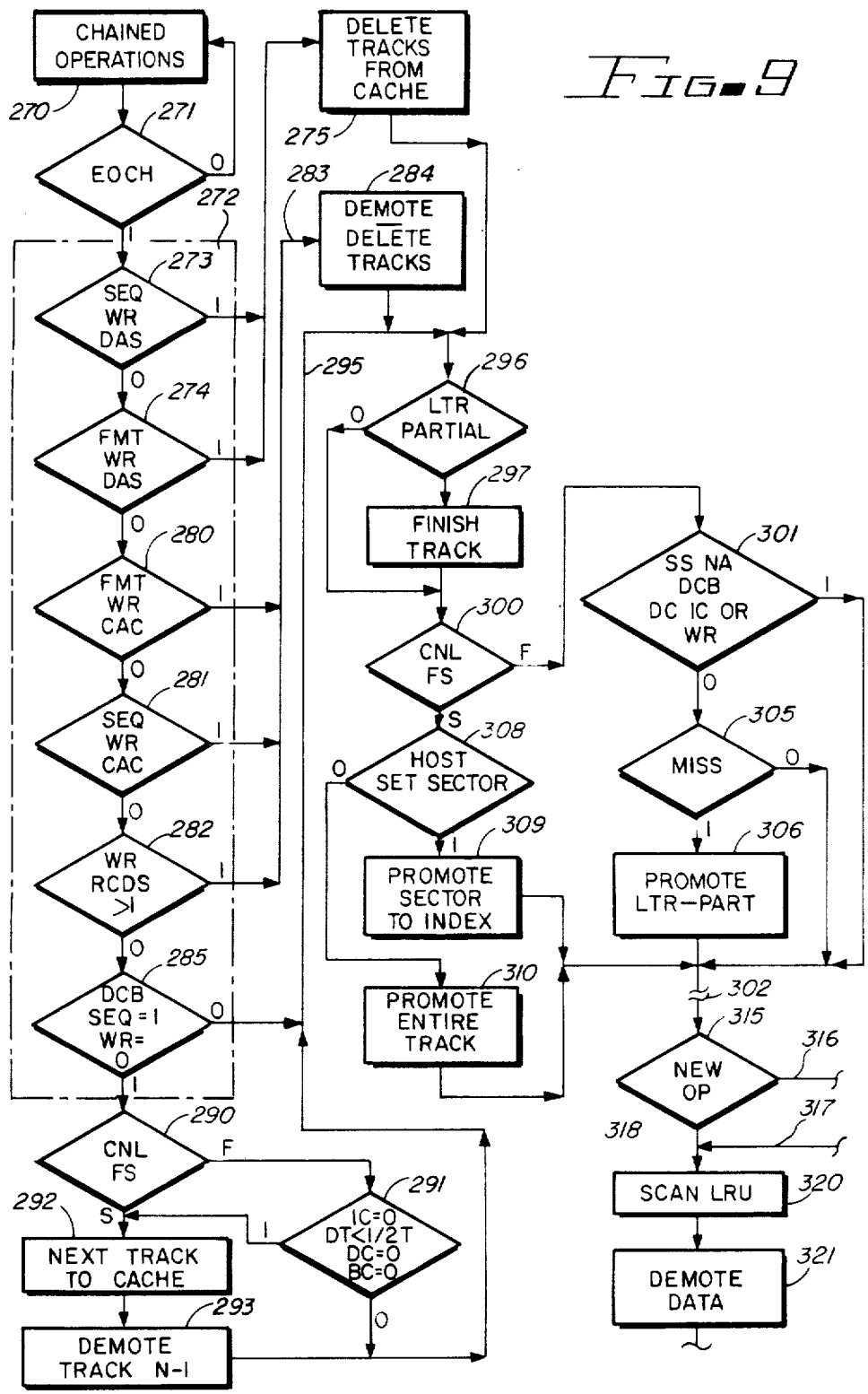
FIG. 9 is a machine operations chart illustrating asynchronous or so-called post-chaining operations of the FIGS. 1 and 2 illustrated system which pertain to practicing the present invention in a best mode.

FIG. 9 shows post-chain operations 92. Upon completion of a chained peripheral operation 270, as detected at 271 by ACE 50P after final status has been sent to host 11, the tallied status bits stored in tally 112 of DCB 62 are examined by processor 31P as a branch control for executing branches 272. Branches 272 are the usual branch instructions within programmed processor 31P. A first branch instruction 273 examines the sequential bit SEQ 126 of DCB 62 received from a using unit 11 for chained peripheral operation 270 and whether a write command was received in that chain as indicated by WR 116 of DCB 62. If the write occurred via a fast channel, then logic step 275 deletes the data contents of cache 40 corresponding to the DASD 16 altered data by erasing the corresponding directory 43 entries. For a slow channel, all tracks referenced in cache 40, except the last track referenced, are deleted from cache. The last track referenced is made less recently used. In a similar manner, at 274 a format write (FMT) was executed (tally 112) and cache 40 was not updated, i.e. all writing was to DASD 16. When this occurs, logic step 275 is also performed. If neither of the conditions in branch steps 273, 274 are satisfied; then at 280, if a format write command was received and a write operation was made to cache 40 via CAC 61P, then logic path 283 is followed to step 284 for moving the altered data from cache 40 to DASD 16 and then delete that data from cache 40. Even with the end-of-chaining condition at 271, the chain of commands have not been completed by system 10. That is, in response to the host signalling "end-of-chain," system 10 supplied a CHANNEL END but no DEVICE END telling host 11 that data is still to be written from cache 40 to DASD 16. Upon completion of such demotion, system 10 sends a DEVICE END using the usual procedures for late DEVICE END reporting. In a similar manner at 281 if a write to cache 40 occurred when sequential data is indicated (SEQ 126=1), then such updated tracks, except the last track referenced, are removed from cache 40. Also, at 282 when the number of records updated in a track stored in cache 40 is greater than one, then those tracks are removed from cache 40. If none of the conditions in steps 273 through 285 are satisfied, then the sequential attribute set forth in SEQ bit 126 of DCB 62 has been received for the current command chain and no writing has occurred. For sequential data, processor 31P wants to determine data promotion and demotion for the sequential data set. This promotion and demotion is determined differently for fast and slow channels. Accordingly, at 290 processor 31P examines F bit 121 for the current command chain that was just completed. If the F bit is set to unity for data promotion relating to a fast channel, processor 31P at 291 examines whether the cache inhibit IC bit 124, bypass cache bit 125 and deactivate caching bit 123 are zero and the extent of the data transfer to host 11 from peripheral system 10 (please remember that there were no writes in the command chain). A data transfer must be not greater than a given percentage of the track capacity, for example, one-half of a track. The size of the data transfer is monitored during data access portion 85 which includes a byte count (not shown) stored in control store 73 for the duration of a command chain. Since the capacity of each DASD storage track is known, at the completion of the chain of command, the tallied byte count for the current command chain for each of the tracks accessed is compared with the track capacity to determine the amount of data transferred to host 11. For all of these conditions met or a slow channel was involved with the command chain, processor 31P at 292 transfers the track following the last track referenced (LTR) to cache 40 from DASD 16. LTR is identified in section 113 of DCB 62 for the last command in the chain. Then at 293, processor 31P causes the track immediately preceding the last track referenced to be demoted from cache 40.

From steps 275, 284, 285, 291 and 293, logic path 295 leads processor 31P to step 296 whereupon directory 43 is accessed (ADEB 76 may still contain the entry and therefore may be accessed in lieu of accessing directory 43) to read P bit 107. If P bit equals unity, a partial copy of the data in last track referenced is currently residing in cache 40. If this is the case, at 297, processor 31P actuates DAC 56P to promote data from DASD 16 to complete the partial copy in cache 40. Generally a partial copy is copied into cache 40 in a manner that the last portion of the track, i.e. the portion of the data immediately preceding the index mark is in cache 40. Therefore, finishing the track promotion amounts to promoting the first part of the track through the first referenced point (which marks beginning of the copy in cache 40) into cache 40. To reduce data promotion times, such promotion of the first portion of LTR is deferred until a cache miss occurs as a result of accessing such unpromoted first portion. At this preferred arrangement, step 297 is incorporated into step 224 of FIG. 7.

From step 297 or 296 processor 31P follows logic path 298 to perform further data promotion analyses. At 300 for a fast channel supplied command in the immediately preceding chain of commands, processor 31P at 301 examines DCB 62 DC bit 123, IC bit 124, WR bit 116 and operational status (SSNA system storage not available) cache of 40 for determining its availability. If cache 40 is not available or any of the other criteria were set to unity, then all inter-chain or asynchronous data promotion is inhibited. Processor 31P then proceeds directly to terminating steps 302 which enables processor 31P to exit the post chaining operation. On the other hand, if none of the above-stated conditions are met, then at 306 processor 31P examines miss bit 127 of DCB 62 for the device address of the immediately preceding command chain. For a cache miss with a fast channel at 306 the last track referenced (LTR) is promoted on a selective basis to cache 40. For a slow channel all promotion has occurred except in sequential data processing the data contents of the next track to be accessed has not yet been promoted. If the last data access or reference from the miss (which could have been satisfied by directly accessing DASD 16) is in the last 80 percent of the track immediately preceding the index mark, then that portion is promoted to cache 40. That is, that portion from the point of reference to the index mark. If the reference to LTR was in the first 20 percent of the track, then the entire track is promoted to cache 40. The percentages can vary from the last 98 to the last 40 percent. Again, LTR is identified in field 113 of DCB 62. For no cache miss having occurred; there is no data promotion, i.e. the data is already in cache 40.

For a slow channel, processor 31P at 308 determines whether or not a host 11 has sent a set sector command for LTR. For a set sector command, processor 31P at 309 promotes that portion of the data track from the sector identified in the said sector to the index mark, i.e. a partial track promotion. For a slow channel, partial track promotion occurs at step 86 of FIG. 3 (synchronous to the I/O operation). Step 92 promotes the next track in sequential data for the slow channel. A host sending the set sector command is signifying to the peripheral system 10 that the host is interested in data beginning at the sector identified in the set sector command. Accordingly, only that data which is indicated as being of interest to the host is promoted. Without a set sector command being detected at 308, processor 31P at 310 promotes the entire track of data of any track referenced by the host such as in a seek command but did not have a set sector command. From steps 309, 310, processor 31P proceeds to ending nonpertinent steps 302.

Upon completion of the post chaining operation, processor 31P proceeds to look for new work. For example, at 315 if a new operation (new op) or a new command was received from host 11; then logic path 316 would follow to perform new operations. Such a new operation may also be an alert signal received from a DASD 16. Upon returning from such operations as via path 317 or if no new operation occurred at 315, processor 31P proceeds via path 318 to step 320 for scanning the LRU list 105 of directory 43 (FIG. 4) up to a given threshold, for any data identified in cache 40 that has the M bit 106 set to the active condition. Such data is demoted from cache 40 to DASD 16 at 321. The processor 31P proceeds to look for additional system work in a usual manner.

While the invention has been particularly shown and described with reference to preferred embodiments thereof, it will be understood by those skilled in the art that various changes in form and details may be made therein without departing from the spirit and scope of the invention.

What is claimed is:

1. A peripheral data-storage system having a caching data buffer connected to a backing data store with a given minimal data-transfer rate, means for transferring data between said caching data buffer and said backing store, means for connecting said data-storage system to a plurality of peripheral channels, some of said peripheral channels being fast channels with maximal data-transfer rates of not less than said given data-transfer rate and others of said peripheral channels being slow channels having maximal data-transfer rates less than said given data-transfer rate; system control means coupled to said connecting means, said caching buffer and said backing data store, means in said control means for receiving operation-mode-indicating signals from said connecting means which indicate respective given desired modes of operation relating to usage of said caching buffer during ensuing data transfers between said channels and said data-storage system, said data buffer having a plurality of allocatable and addressable data-storage areas;

fast-control means in said system control means and being responsive to said mode-indicating signals and to said ensuing data transfers with a fast one of said channels to remove data from and limit data transfers to said caching buffer in accordance with said ensuing data transfers and said operation-mode-indicating signals;

buffer-data replacement-control means in said system control means for keeping an LRU list in accordance with data transfers between any of said channels and said caching buffer such that one end of the LRU list identifies data stored in said data buffer that is most-recently used while the other end of said LRU list identifies data stored in said data buffer that is least-recently used and having means for transferring data between said caching buffer and said backing store in accordance with said LRU list, said operation-mode-indicating signals and said ensuing data transfers; and slow-control means in said system control means for being responsive to said ensuing data transfers with a slow one of said channels to require all of said slow-channel-related data transfers to include said caching buffer and being further responsive to said operation-mode-indicating signals and said slow-channel-related ensuing data transfers to adjust said LRU list in accordance with said operation-mode-indicating signals and said slow-channel-related ensuing data transfers whereby even when said operation-mode-indicating signals indicate reduced desired usage of said caching buffer data occupancy in said caching buffer for fast-channel ensuing data transfers and for slow-channel ensuing data transfers that replacement of data from said caching buffer is adjusted in accordance with said operation-mode-indicating signals for all of said channels.

2. The peripheral data-storage system set forth in claim 1 wherein:

said fast-control means further includes means for analyzing read data transfers for promoting data to said data buffer from said backing store in accordance with first predetermined criteria derived from said operation-mode-indicating signals and said ensuing data transfers; and said slow-control means having means for promoting data from said backing store to said data buffer for each and every type of data transfer whereby said data buffer operates as a first in, first out (FIFO) buffer for the slow channels and further having means for demoting data from said data buffer to said backing store in a FIFO manner for write data transfers from said slow-channel means to said backing store.

3. The peripheral data-storage system set forth in claim 1 further including:

means in said system control means for receiving a given operation-mode signal from either said slow or fast channel for indicating that said data buffer is to have a predetermined non-use with respect to a given set of said ensuing data transfers;

means in said fast-control means coupled to said non-use means for controlling all data transfers between said data-storage system and said fast-channel means in accordance with said received operation-mode-indicating signals; and means in said slow-channel means coupled to said non-use indicating means and to said replacement control means for responding to said non-use indicating means and to data transfers with a slow channel flowing through said data buffer for activating said replacement control means to give a predetermined priority of removal from said data buffer to said backing store for all slow channel data signals related to said non-use indicator.

4. The peripheral data-storage system set forth in claim 3 wherein said replacement control means in keeping said LRU list in accordance with said data transfers to said non-use responsive means of said slow control means to identify data related to said non-use indicating means in said LRU list a predetermined number of entries from the least-recently used entry on said LRU list, whereby recently transferred data associated with said non-use indication is data stored in said data buffer that is soon to be replaced but not the first data to be replaced.

5. The peripheral data-storage system set forth in claim 3 wherein:

said non-use indicator indicates bypassing said data buffer; and said non-use responsive means of said fast control means inhibiting any access to said data buffer for any data transfers between said peripheral data-storage system and a fast channel in said ensuing data transfers.

6. The peripheral data-storage system set forth in claim 3 further including sequential means in said system control means for receiving and storing an operation-mode-indicating signal indicating that sequential data will be transferred in said ensuing data transfers; and said sequential means being coupled to said fastcontrol means, said slow-control means and to said replacement control means for causing promotion of data from said backing store to said data buffer upon the completion of any given read type of data-transfer operation to promote data from said backing store to said data buffer which is logically next following the just-completed data transfer irrespective of whether the data transfer is with a fast or a slow channel.

7. The peripheral data-storage system set forth in claims 1 or 3 further including set sector means in said system control means for receiving a SET SECTOR peripheral command from either a fast or a slow channel and being responsive to said fast channel supplied SET SECTOR peripheral command for accessing data from either said data buffer or said backing store and being coupled to said slow-control means for being responsive to said received SET SECTOR peripheral command for activating said slow-control means to promote data contents of a backing store data track containing the sector from said backing store to said buffer store when data identified by the received SET SECTOR peripheral command is not currently stored in said data buffer.

8. The peripheral data-storage system set forth in claims 1 or 3 wherein said replacement control means has means responsive to completion of a data-transfer operation with a slow-control means to complete transfer of a segment of data referred to in a just-completed data-transfer operation, and having means responsive to completion of an operation by said fast-control means to promote data to said data buffer when no writing occurred in predetermined preceding data-transfer operations with respect to the given fast channel and when a predetermined portion of a data segment was transferred from said backing store to either said fast channel or said cache in a said preceding data-transfer operation.

9. The peripheral data-storage system set forth in claims 1 or 3 wherein said replacement control means includes means responsive to the fast-channel control means to promote data from said backing store to said data buffer asynchronously to any data transfers between the data buffer and the fast channel and having further means connected to said slow-control means for transferring data between said backing store and said data buffer substantially synchronously to data transfers between said data buffer and said slow channel.

10. The peripheral data-storage system set forth in claims 1 or 3 wherein said replacement control means includes data-storage space-allocation means operable with said data buffer for allocating data-storage areas for ensuing data transfers; and said replacement control means allocating said data buffer data-storage areas independent of whether said ensuing data transfers are to be through a fast or slow channel.

11. The peripheral data-storage system set forth in claims 1 or 3 wherein said replacement control means keeps said LRU list for fast and slow channels in an identical manner whereby replacement control is independent of the type of channel over which data transfers occur such that interleaving data transfers of given data between fast and slow channels does not alter replacement-control operations.

12. The peripheral data-storage system set forth in claim 11 further including means in said replacement control means coupled to said control means mode-signal receiving means for being responsive to predetermined ones of said received operation-mode-indicating signals to alter said replacement-control operations in a predetermined manner such that predetermined recently-accessed data stored in said data buffer is replaced earlier than other less-recently used data also stored in said data buffer is replaced.

13. A data-storage hierarchy having a fast front store and a backing store coupled to the front store for transferring data signals therewith, said front store having a plurality of allocatable and addressable data-storage areas, said backing store having a given data-transfer rate, slow-channel means connected to said hierarchy for transferring data signals therewith at a rate less than said given rate, a fast-channel means connected to said hierarchy for transferring data signals therewith at rates including said given rate;

the improvement including, in combination:

data-promotion control means coupled to both said stores and both said channel means for primarily transferring data between said stores synchronously to data transfers with said slow-channel means and asynchronously to data transfers with said fast-channel means; and data-transfer means coupled to said channel means, and said stores for transferring data between said fast-channel means and said backing store to the exclusion of said front store and between said front store and said backing store.

14. The data-storage hierarchy set forth in claim 13 wherein:
said data-promotion control means includes sequential means coupled to said fast- and slow-channel means for receiving a sequential-indicating signal for indicating that ensuing data transfers will transfer sequential data and being coupled to said data-transfer means for activating said data-transfer means to promote data from said backing store to said front store which is logically next-occurring sequential data whenever a given sequential data transfer has been completed and for removing from said front store predetermined portions of sequential data currently stored in said front store that is related to the just-completed sequential data-transfer.

15. The data-storage hierarchy set forth in claim 13 further including:
limited-use means in said data-promotion control means for receiving front store use-limiting indicating signals and said data-promotion control means being responsive to said received use-limiting indicating signals to limit access to said front store for all data transfers between a fast-channel means and said storage hierarchy in accordance with said received use-limiting indicating signals and for limiting data occupancy of such data being transferred related to said use-limiting indicating signals for those data transfers between a slow-channel means and said data-storage hierarchy.

16. The data-storage hierarchy set forth in claim 13 further including:
data-promotion modification means in said data-promotion control means for receiving a bind signal together with an identification of predetermined data from either a fast- or a slow-channel means and for actuating said data-promotion control means to maintain a copy of said predetermined data in said front store irrespective of any other operations in said data-storage hierarchy.

17. The data-storage hierarchy set forth in claim 13 wherein:
said data-promotion control means further includes front-store addressable-area allocation means for dynamically allocating said data-storage areas in said front store for data transfers between either said slow or fast-channel means and said data-storage hierarchy independent of whether or not such data transfer is with a fast- or slow-channel means.

18. The data-storage hierarchy set forth in claims 13 or 17 wherein said data-promotion control means further includes:
replacement control means for selectively demoting data from said front store to said backing store;
LRU list means in said replacement control means, said replacement control means having means responsive to current data transfers between either of said fast- or slow-channel means with said front store to adjust the listing of data-storage areas of said front store identified in said LRU list means in accordance with said data transfers such that a most-recent data transfer between any of said channel means and said front store becomes a most-recently used entity on the LRU list means while the oldest data area subjected to a data transfer with any of said channel means is on the other end of the list as a least-recently used (LRU) entity, said data-storage area currently storing data most likely to be replaced is identified as said LRU entity;
said data-promotion control means having means for receiving operation-mode signals from either of said channel means and being responsive thereto to alter data promotion and replacement operations of said data-promotion control means in a first mode for data transfers with a fast-channel means and in a second mode for data transfers with said slow-channel means; and
said replacement control means being operative to demote data from said data buffer to said backing store independent of said received operation mode signals.

19. The data-storage hierarchy set forth in claims 13 or 17 wherein:
said data-promotion control means includes means for operating said front store in a caching mode for data transfers with said fast-channel means and having means for operating said front store as a FIFO (first in, first out) data buffer for data transfers with said slow-channel means.

20. The data-storage hierarchy set forth in claims 13 or 17 wherein:
said data-promotion control means operates with said front store and with a fast-channel means in a manner that data transfers between said front store and said backing store make the front store appear as a cache to the backing store and further having means for operating with said slow-channel means and said front store such that data transfers between said front store and said backing store make said front store appear as a FIFO (first in, first out) buffer and said data-promotion control means being operative to replace data in said front store with data from said back store in accordance with predetermined criteria independent of whether said front store is caching or buffering data.

21. The data-storage hierarchy set forth in claims 13 or 17 wherein:
said data-promotion control includes means for monitoring attempted accesses to said front store by either of said channel means;
when a given attempted access from a fast-channel means finds no data in said front store, then all subsequent data transfers within a given range of data transfers will occur between said fast-channel means and said backing store to the exclusion of the front store; and
said data-promotion control means having means operatively associatable with said slow-channel means for responding to a miss of data access to said front store by a slow-channel means attempted access to promote such requested data to said front store from said backing store for relaying to said slow-channel means.

22. A data-storage hierarchy having a fast front store and a backing store coupled to the front store for transferring data signals therewith, said backing store having a given data-transfer rate, a slow-channel means connected to said hierarchy for transferring data signals therewith at a rate less than said given rate, a fast-channel means connected to said hierarchy for transferring data signals therewith at rates including said given rate; said front store having a plurality of allocatable and addressable data-storage areas for storing data being transferred by said data transfers;

the improvement including, in combination:

first control means coupled to said stores and all said channel means for enabling transfers of data signals between either of said stores and said fast-channel means and for enabling transfers of data signals between said front store and said slow-channel means; and replacement control means coupled to said stores and said first control means for enabling transferring data signals therebetween and for managing said front store data storage areas in accordance with data transfers with all of said channel means such that said data transfers between said backing store and said slow-channel means via said front store occur substantially independent of said data transfers between said fast-channel means and said storage hierarchy whereby data transfers with said slow-channel means tend not to interfere with data transfers of said fast-channel means.

23. The data-storage hierarchy set forth in claim 22 further including:

inhibit-front-store-loading means in said first control means for receiving from any of said channel means a signal indicating that in a given ensuing set of data transfers between said any channel means and said data-storage hierarchy no data is to be transferred from said backing store to said front store for storage therein, said inhibit-front-store-loading means being coupled to said replacement control means for inhibiting transfer of data signals from said backing store to said front store whenever said any channel means is a fast channel and whenever said any channel means is a slow channel to actuate said replacement control means to replace data associated with said inhibit-front-store-loading signals in a priority greater than replacing other data currently stored in said front store.

24. The data-storage hierarchy set forth in claim 22 further including:

set sector means in said first control means for receiving a SET SECTOR command from any of said channel means and being responsive to a SET SECTOR command received from a fast-channel means to examine said front store for content of said data associated with said SET SECTOR command and if such data is not in said front store accessing said backing store in accordance with said received SET SECTOR command and being responsive to said received SET SECTOR command from a slow one of said channel means to promote a segment of data associated with said received SET SECTOR command from said backing store to said front store whenever said front store is not currently storing such associated data.

25. The data-storage hierarchy set forth in claim 22 further including:

sequential means in said first control means for receiving a sequential signal from any of said channel means for indicating that a given ensuing set of data transfers is primarily concerned with sequential data and being responsive to said received sequential signal to supply control signals to said replacement control means for altering promotion of data to said front store from said backing store in accordance with said received sequential signal substantially independent of whether said received sequential signal is received from a fast- or a slow-channel means.

26. The data-storage hierarchy set forth in claim 22 further including:

fast-control means in said first control means for enabling said data transfers between said backing store and said front store in a predetermined manner to make the front store appear as a cache for said backing store for all data transfers associatable with a fast-channel means and further having a slow-control means for enabling data transfers between said backing store and said front store such as to operate said front store as a FIFO (first in, first out) buffer between a slow-channel means and said backing store; and said replacement control means being for replacing data in said front store with data from said backing store independent of said fast- or slow-channel means data transfer operations.

27. A data-storage hierarchy set forth in claim 22 further including:

bind means in said first control means for receiving a bind signal from a given one of said channel means together with an indication of data to be bound to said front store and for supplying control signals to said replacement control means for inhibiting replacement of said bound data from said front store to said backing store.

28. The data-storage hierarchy set forth in claim 22 wherein:

said replacement control means includes an ordered list for identifying addressable and allocatable data-storage areas of said front store and being ordered in accordance with recent data transfers with any of said channel means independent of whether or not said channel means handling such data transfers is a fast- or slow-channel means, and being further operative when monitoring predetermined data transfers with a said slow-channel means for identifying predetermined ones of said front store data storage areas in said ordered list in a portion of said ordered list indicating replacement sooner than that would be indicated by the recentness of usage of such data by said slow-channel means whereby data occupancy in said front store for data transferred by said slow-channel means is limited with respect to said predetermined data transfers.

29. The data-storage hierarchy set forth in claim 22 wherein:

said replacement control means includes an ordered list of said data-storage areas of said front store arranged in accordance with recentness of usage of data stored in the respective ones of said front-store data-storage areas; and means in said replacement control means for monitoring data transfers between any of said channel means and said front store and reordering said ordered list in accordance with said monitored data transfers independent of whether the channel means handling such monitored data transfers is a fast- or slow-channel means whereby data occupancy of said front store is independent of the characterisrics of the channel means effecting data transfers with said front store.

30. The data-storage hierarchy set forth in claim 29 further including:

use-limiting means in said first control means coupled to all of said channel means for receiving from any of said channel means an indicator signal for indicating that a given ensuing set of data transfers are not to use the front store and being operative during said set of ensuing data transfers for all data transfers with a fast-channel means to limit the usage of said front store in accordance with said received indicator signals whereby data transfers occur directly between said backing store and a fast-channel means and being further operative with respect to a slow-channel means to enable data transfers therewith through said front store but to adjust said ordered list in accordance with said received indicator signal for the ensuing data transfers such that any data residing in said front store as a result of said ensuing data transfers are replaced on a predetermined priority higher than a replacement priority for other data stored in said front store.

31. A data-storage hierarchy having a fast front store and a backing store coupled to the front store for transferring data signals therewith, said backing store having a given data transfer rate, slow-channel means connected to said hierarchy for transferring data signals therewith at a rate less than said given rate, fast-channel means connected to said hierarchy for transferring data signals therewith at rates including said given rate, said front store having a plurality of allocatable and addressable data-storage areas;

the improvement including, in combination:

replacement control means being coupled to all said stores and all said channel means for transferring data signals between said stores in accordance with data transfers between all of said channel means and either of said stores such that said front store tends to store data to be next accessed from said data-storage hierarchy;

modification means in said replacement control means coupled to all of said channel means for receiving from any one of said channel means a signal indicating a desired predetermined non-usage of said front store for a given ensuing sequence of data transfers with said one channel means; and said replacement control means having means responsive to said received signal from a fast-channel means to effect said predetermined non-use during said given ensuing sequence of data transfers and having means responsive to said received signal from a slow-channel means to replace data stored in said front store as a result of completing ones of said data transfers in said given ensuing sequence of data transfers prior to replacing other data then stored in said front store not related to said given sequence of data transfers whereby data transferred in said given ensuing sequence of data transfers with a fast-channel means has said predetermined non-use of said front store while data transferred with a slow-channel means in said given ensuing sequence of data transfers is stored in said front store a minimal time.

32. The data-storage hierarchy set forth in claim 31 wherein:

said replacement control means being for operating said front store for all data transfers with a said fast-channel means as a cache for said backing store and for all data transfers with a slow-channel means as a FIFO (first in, first out) buffer, and having means for subjecting both of said front store operations to said modification means control.

33. The data-storage hierarchy set forth in claim 31 further including:

bind control means in said replacement control means for receiving a bind signal from any of said channel means together with an indication of the data areas in said backing store which contain data and which when promoted to said front store are to remain in said front store irrespective of other replacement controls and independent of whether said supplying channel means is a fast- or a slow-channel means.

34. The data-storage hierarchy set forth in claim 31 further including:

sequential means in said replacement control means for receiving a sequential signal from any of said channel means and for being responsive thereto for actuating said replacement control means to promote data from said backing store to said front store having a predetermined logical relationship of a currently completing data transfer with either a fast- or slow-channel means.

35. The data-storage hierarchy set forth in claim 31 further including:

set sector means in said replacement control means for being responsive to a SET SECTOR command received from a slow-channel means for examining said front store to see if data is stored in said front store corresponding to said received SET SECTOR command, if not, promoting an entire segment of data from said backing store to said front store even though no request for such data has been received from such a slow-channel means and for being responsive to a SET SECTOR command received from a fast-channel means and to no data being stored in said front store with respect to said received SET SECTOR command to momentarily bypass said front store for enabling data transfers directly between said backing store and said fast-channel means.

36. The data-storage hierarchy set forth in claim 35 wherein:

said replacement control means includes data-promotion control means associatable with all data transfers with a slow-channel means for substantially synchronously promoting data from said backing store to said front store for all data requests received over any slow-channel means.

37. The data-storage hierarchy set forth in claims 31 or 35 wherein:

said replacement control means includes an ordered list of said allocatable and addressable data-storage areas of said front store with means to order the list in accordance with recency of requested accesses from any of said channel means and further having means for inserting into said ordered list in a portion indicating soon to be replaced data all that data stored in said front store associatable with data transfers with a slow-channel means of a predetermined type such that said predetermined type of data is replaced sooner than other data currently stored in said front store.

38. The data-storage hierarchy set forth in claim 31 wherein:

said replacement control means has means for maintaining an ordered list of data stored in said front store in accordance with recency of access by a channel means independent of whether said channel means is a fast- or slow-channel means.

39. The data-storage hierarchy set forth in claim 31 further including:

means in said replacement control means for asynchronously promoting data from said backing store to said front store with respect to all data accesses from a fast-channel means and for substantially synchronously promoting data from said backing store to said front store with respect to all data transfers with a slow-channel means.

40. A data-storage hierarchy having a fast front store and a backing store coupled to the front store for transferring data signals therewith, said backing store having a given data-transfer rate, slow-channel means connected to said hierarchy for transferring data signals therewith at a rate less than said given rate, fast-channel means connected to said hierarchy for transferring data signals therewith at rates including said given rate, said front store having a plurality of allocatable and addressable data-storage areas;

the improvement including, in combination:

limited-use indicating means being coupled to all of said channel means for receiving a limited-use signal from a one of said channel means and for storing said received signal for indicating that a given ensuing sequence of data transfers of said one channel means is to have a predetermined non-use of said front store; and control means being coupled to said indicating means and both of said stores for limiting fast-channel means given data transfers in said given ensuing sequence of data transfers to said predetermined non-use of said front store while during slow-channel means given data transfers in said given ensuing sequence of data transfers storing such given data being transferred in said front store beyond said indicated predetermined non-use and having means for storing other data in said front store likely to be next accessed such that storage of said given data is limited to that portion thereof most likely to be next accessed.

41. The data-storage hierarchy set forth in claim 40 wherein:

said control means includes bind means coupled to all of said channel means for receiving from any of said channel means a bind-indicating signal for indicating that predetermined data is to be stored in said front store and said bind means being coupled to said limited-use indicating means for ensuring that all bound data remains stored in said front store independently of said limited-use indication.

42. The data-storage hierarchy set forth in claim 41 further including sequential means in said control means for receiving from any of said channel means a sequential-indicating signal for indicating that a given set of ensuing data transfers will transfer sequential data and said sequential means being for activating said control means during said given set of ensuing data transfers to transfer data to said front store from said backing store having a given predetermined logical relationship to data being transferred in a current data transfer independent of whether said data is being transferred with a fast- or a slow-channel means.

43. The data-storage hierarchy set forth in claim 41 wherein:

said control means has first means for operating said front store as a cache for said backing store for all data transferred with respect to a fast-channel means and as a FIFO (first in, first out) data buffer for all data transfers with a slow-channel means.

44. The data-storage hierarchy set forth in claim 41 further including:

data-storage-space-allocation means in said control means for dynamically allocating data-storage areas of said front store to a plurality of data transfers with either said fast- or slow-channel means with said dynamic allocations being independent of the type of channel means effecting the respective data transfers relating to such dynamic allocations.

45. The data-storage hierarchy set forth in claim 41 wherein said control means includes first data-promotion means operative in response to data transferred with a fast-channel means for asynchronously promoting data from said backing store to said front store with respect to data transferred between said front store and said fast-channel means and having second means responsive to data transferred and received requests for data transfers by a slow-channel means to transfer data signals between said front store and said backing store synchronously to such received requests for data transfers.

46. The data-storage hierarchy set forth in claims 41 or 42 further including:

means in said control means responsive to a data request received from a fast-channel means to bypass said front store in favor of transferring data directly between the fast-channel means and said backing store and having second means responsive to requests for data transfers received from a slow-channel means to transfer all data signals through said front store between the slow-channel means and said backing store; and replacement control means in said control means for ordering the replacement of data from said front store to said backing store in accordance with recentness of non-use and for adjusting said ordered list in accordance with said slow-channel data transfers and ignoring the ordering of the list in all bypassed data transfers with the fast-channel means.

47. The data-storage hierarchy set forth in claim 46 further including means in said control means for being responsive to a data access request received from a fast-channel means and the requested data not being currently stored in the front store, or having space allocated in the front store for such data, to bypass the front store for a predetermined number of data transfers with respect to said fast-channel means such that such predetermined data transfers are all directly between said backing store and said fast-channel means to the exclusion of said front store.

48. A data-storage hierarchy having a fast front store and a backing store coupled to the front store for transferring data signals therewith, said backing store having a given data-transfer rate, slow-channel means connected to said hierarchy for transferring data signals therewith at a rate less than said given rate, fast-channel means connected to said hierarchy for transferring data signals therewith at rates including said given rate;

the improvement including, in combination:

first means for indicating that said front store is not to be used for predetermined data transfers;

second means being coupled to said first means and to said fast-channel means for enabling said predetermined data transfers between said backing store and said fast-channel means to the exclusion of said front store and for enabling using said front store for all data transfers other than said predetermined data transfers of said fast channel means;

third means being coupled to said first means and to said slow-channel means for enabling said predetermined data transfers in two stages, between said backing store and said front store and between said slow-channel means and said front store; and front-store control means for removing said predetermined data of said slow-channel means from said front store in a given priority of removal greater than removing a greater portion of other than said predetermined data currently stored in said front store.

49. A data-storage hierarchy having a fast front store and a backing store coupled to the front store for transferring data signals therewith, said backing store having a given data-transfer rate, slow-channel means connected to said hierarchy for transferring data signals therewith at a rate less than said given rate, fast-channel means connected to said hierarchy for transferring data signals therewith at rates including said given rate; the improvement including, in combination:

first control means coupled to said fast-channel means and both said stores for operating said front store primarily as a caching buffer;

second control means coupled to said slow-channel means and both said stores for operating said front store primarily as a first-in, first-out buffer;

replacement control means coupled to both said stores for removing data from said front store in accordance with data transfers with either of said channel means; and supervisory means coupled to all of said control means for independently operating same essentially simultaneously such that data being transferred with either of said channel means simultaneously occupy portions of said front store.

50. A method of operating a data-storage hierarchy having a fast front store and a backing store coupled to the front store for transferring data signals therewith, said backing store having a given data-transfer rate, slow-channel means connected to said hierarchy for transferring data signals therewith at a rate less than said given rate, fast-channel means connected to said hierarchy for transferring data signals therewith at rates including said given rate;

the improvement including the steps of:

when firstly transferring data between said backing store and said slow-channel means, storing all of such data in said front store as a step in said first data transfers; and when secondly transferring data between said backing store and said fast-channel means, storing only predetermined data in said front store as a step in said second data transfers including selecting said predetermined data from said secondly transferred data in accordance with predetermined criteria such that less than all of said secondly transferred data is stored in said front store as an incident to said second data transfers.

51. The method set forth in claim 50 wherein said backing store includes a plurality of direct-access data-storage devices, each having a plurality of addressable data-storage tracks for containing data to be accessed and for receiving data to be stored;

further including the steps of:

upon completion of a said first data transfer, examining the contents of said front store with respect to the data stored in a corresponding track of the backing store; if the data contents of the front store is less than the data contents of the last track referenced, complete the data contents of the front store to be congruent with the data contents of the corresponding backing store track; and upon completion of a said second data transfer, promoting data from an accessed one of said tracks of said backing store to said front store only upon predetermined criteria being met including criteria developed in data transfers completed prior to said second data transfer.

52. The method set forth in claim 50 further including:

receiving a SET SECTOR command from a one of said channel means;

when said one channel means is a slow-channel means, then examining the front store to determine whether or not said front store contains data associatable with said received SET SECTOR command; if the front store contains such data, then responding to said SET SECTOR command, otherwise promoting data from said backing store to said front store which is associatable with said received SET SECTOR command and then responding to said received SET SECTOR command; and when said one channel means is a fast-channel means, firstly accessing said front store for determining whether or not data associatable with said received SET SECTOR command is in said front store, if such data is in the front store then responding to said received SET SECTOR command; otherwise accessing said backing store for responding to said received SET SECTOR command.

53. The method set forth in claims 50, 51 or 52 wherein said front store has a plurality of allocatable and addressable data storage areas;

further including the steps of:

ordering identifications of said allocatable data storage areas within a list in accordance with recent usages of the respective allocatable data storage areas by either said fast- or slow-channel means;

maintaining said ordered list in accordance with ensuing data transfers between the front store and any of said channel means;

promoting data from said backing store to said front store for said fast- and slow-channel means in accordance with first predetermined criteria related to data transfers associatable with the respective fast-and slow-channel means;

replacing data stored in said front store with data from said backing store in accordance with said data promotions and demoting data from said front store to said backing store in accordance with said ordered list and independent of whether data stored in said front store to be replaced or demoted was been stored in said front store through data transfers associatable with fast- or slow-channel means.

54. The method set forth in claim 53 further including the steps of:

for predetermined data transfers with a slow-channel means, maintaining said ordered list for such predetermined data transfers by adjusting the ordered list with identifications of said allocatable data-storage areas of the front store within the list at an intermediate position closer to an end of the ordered list representing a least-used allocatable data-storage area and adjusting said ordered list by moving the identification in the list of an allocatable data-storage area to a most-recently used end for each data transfer other than said predetermined data transfer and replacing data and demoting data based upon the proximity of the identity of the allocatable data storage area containing the data to said least recently used end.

55. The method set forth in claim 50 wherein said front store has a plurality of allocatable and addressable data-storage areas; further including the steps of:

dynamically allocating data-storage areas of said front store for data transfers with either said fast- or slow-channel means such that said dynamic allocation is independent of whether the channel means relatable to allocation of a given data-storage area is a fast- or slow-channel means and is according to whether a data transfer is expected to occur in a predetermined relationship to the allocated data-storage space whereby such data-storage areas allocated to said slow-channel means tend not to interfere with data transfers and data-storage areas for allocated said fast-channel means.

56. The method set forth in claim 50, further including the steps of:
receiving a mode-indicating signal from a one of said channel means and adjusting the operation of said data storage hierarchy for both said fast- and slow-channel means in accordance with said received mode-indicating signal for a predetermined set of ensuing data transfers between any of said channel means and said data storage hierarchy.

57. The method set forth in claims 50 or 56, further including the steps of:
receiving a first mode-indicating signal from a one of said channel means;
responding to said received one mode-indicating signal during predetermined ensuing data transfers with a fast-channel means by altering modes of operating said data storage hierarchy by adjusting the then current operational relationships between said front store, said backing store and said fast-channel means for facilitating data transfers between said backing store and said fast-channel means; and
responding to said one mode-indicating signal for data transfers with a slow-channel means by altering the then current operations of said data storage hierarchy by adjusting the operational relationships between said front store, said backing store, and said slow-channel means for limiting the data storage contents of said front store in predetermined ensuing data transfers of said data storage hierarchy with said slow-channel means.

58. The method set forth in claims 50 or 56, further including the steps of:
transferring data with each of said channel means in a chain of commands associatable with a set of data transfers; and
upon the completion of said transferring data in said chain of commands, adjusting the data contents of said front store by replacing data stored in said front store at the completion of said chain of commands with predetermined data from said backing store and by demoting a first predetermined portion of such front stored data from said front store to said backing store and erasing a second predetermined portion of such data from said front store all in accordance with recency of usage of such data stored in the front store by any of said channel means and adjusting said data hierarchy operations within a chain of commands in accordance with predetermined criteria received from a channel means operationally associated with such chain of commands.

59. The method set forth in claims 50 or 56, further including the steps of:
receiving a data-access request from any one of said channel means;
examining the data contents of said front store for the received data-access request, if the data to be accessed is stored in said front store or data storage areas of said front store are currently allocated for such received data-access request, responding to said data-access request by accessing said front store for a data transfer;
if the examination of said front store shows no allocation of a data-storage area or data contents for the received data-access request, then for a data-access request received from a fast-channel means bypassing the front store and accessing the backing store to the exclusion of said front store for the received data-access request while for a slow-channel means promoting data from said backing store to said front store or allocating space in said front store for enabling the data-storage hierarchy to respond to said received data-access request.

60. The method set forth in claim 59 wherein said backing store includes a plurality of direct-access-data-storage devices each having addressable data-storage areas arranged in a series of concentric data-storage tracks for containing data on a plurality of record storage surfaces, all of said data-storage tracks in each of said devices having a common radius comprising a cylinder of tracks;
further including the steps of:
in responding to said received data-access request for a fast-channel means when bypassing said front store, continuing said bypass for subsequently received data-access requests relating to a backing store data-storage areas in the same cylinder of tracks on a given direct access storage device, upon receiving a data-access request relating to backing store data-storage areas outside said same cylinder, remove said front store bypass.

61. The method set forth in claims 50, 51, or 55, further including the steps of:
receiving from a one of said channel means a bind signal for indicating predetermined data is to be bound to said front store;
storing and maintaining data identified with said bind signal in said front store; and
keeping copies of such bound data in said front store and back store in a congruent form so long as said bind signal is effective.

62. The method set forth in claims 50 or 56 further including the steps of:
receiving from a one of said channel means an inhibit cache-load signal with an identification of a portion of said backing store which contains data or may contain data associatable with said inhibit cache-load signal;
in responding to subsequently received data-access requests relating to said identified portion, inhibit promoting data from said backing store to said front store for data transfers associatable with said fast-channel means but for data transfers associatable with said slow-channel means promoting data to said front store and then promptly removing the data from said front store after transferring it to said slow-channel means.

63. The method set forth in claims 50 or 56, further including the steps of:
receiving from a one of said channel means a bypass signal together with an identification of data storage areas of said backing store associatable with said bypass signal;
transferring data in predetermined subsequent data transfers with a fast-channel means by accessing data areas of said backing store associatable with said bypass signal and transferring data directly between said backing store and said fast-channel means to the exclusion of said front store; and transferring data in second predetermined data transfers between a slow-channel means and said identified storage areas of said backing store by transferring data between said backing store, said front store, and said slow-channel means whereby said front store acts as a buffer between the slow-channel means and said backing store, then upon completion of said data transfers in accordance with predetermined recently usage characteristics of data stored in said front store, removing such transferred data from said front store.

64. The method set forth in claims 50 or 56, further including the steps of:

receiving from a one of said channel means a sequential bit signal for indicating that data to be transferred in a given set of ensuing data transfers is sequential data;

for all data within said predetermined set of data transfers, whether such ensuing data transfers are with a fast-channel means or a slow-channel means, transferring data from said backing store to said front store upon completion of a given data transfer within said set of data transfers which has a given logical relationship to said given completed data transfer.

65. The method set forth in claim 50 further including the steps of:

establishing a given mode of operation in said data storage hierarchy in accordance with predetermined critiera associatable with data transfers of said channel means;

in said predetermined mode, bypassing said front store for all data transfers between said fast-channel means and said backing store; and for data transfers with a slow-channel means in said predetermined mode storing the data of such data transfers in said front store a predetermined limited time, which time is a predetermined shorter time than residency times of data associatable with other modes of operation of any of said channel means.

66. The method set forth in claim 50 further including the steps of:

promoting data from said backing store to said front store for data transfers with a fast-channel means in a given asynchronous manner with respect to such fast-channel means data transfers; and promoting data from said backing store to said front store with respect to data transfers with a slow-channel means in a given synchronous manner with respect to such data transfers of said slow-channel means.

67. The method set forth in claim 50 further including the steps of:

for data transfers with a fast-channel means managing data-storage areas of said front store for promotion of data to said front store such that said front store acts as a cache to said backing store for data transfers with respect to the said fast-channel means;

for data transfers with a slow-channel means managing the data-storage areas of said front store for promoting data from said backing store to said front store for such slow-channel means data transfers to make the front store appear as a FIFO (first in, first out) data buffer for such slow-channel means; and replacing data stored in said front store and demoting such data from said front store to said backing store independent of whether or not the store data in said front store was transferred with a fast- or slow-channel means.

68. The method of operating a peripheral data-storage system having a caching buffer coupled to a plurality of large-capacity-data-storage devices for storing data in track-related data units and adapted to be connected to fast and to slow peripheral channels; the slow channels having data-transfer rates less than a minimal data transfer rate of said data-storage devices and the fast-channel having data-transfer rates equal to or exceeding said minimal data-transfer rate;

including the steps of:

indicating predetermined data which need not be stored in said buffer, for data being transferred over said fast channel, promoting data from said devices to said buffer in a manner to discourage write hits and encourage read hits of storage accesses to the peripheral system for encouraging direct access to said devices for data transfers with said fast channel and such that said predetermined data is directly transferred between said devices and said fast channel;

transferring all data to be transferred with said slow channel through said buffer, including for said predetermined data, primarily storing data as entire track-related data units in said buffer, then replacing said predetermined data stored in said buffer more quickly than replacing other data stored in said buffer;

demoting all data from said buffer to said devices for all kinds of data using a common least-recently used replacement control independent of the attachments to and data transfers with any specific ones of said channels.

69. The method set forth in claim 68 further including the steps of:

receiving from any one of said channel means a bind signal together with an indication of data to be bound to said front store; and removing identification of said bound data from said common least-recently used replacement control whereby such bound data resides in said front store independent of any data transfers in said data-storage hierarchy.

70. The method set forth in claim 69 further including the steps of:

receiving a data-access request from a one of said channel means, examining the data contents of said front store to determine whether or not the received data-access request can be satisfied by accessing said front store, if such data access can be satisfied by accessing said front store, responding to the data-access request by accessing the front store;

when the data-access request cannot be satisfied by accessing the front store, for a data-access request received from a fast-channel means, bypassing said front store for satisfying the data-access request by a data transfer directly between a fast-channel means and said backing store; and when said data-access request received from a slow-channel means cannot be satisfied by accessing the front store, then promoting data to said front store from said backing store and transferring data from said front store to said slow-channel means, then removing data stored in said front store resulting from said data transfer with said slow-channel means from said front store more quickly than removing other data stored in said front store and to be removed in accordance with said common least-recently used replacement control.

71. The method set forth in claim 70 wherein said backing store includes a plurality of direct-access-data-storage devices, each having a plurality of cylinders of data-storage tracks, each cylinder consisting of a plurality of data-storage tracks at a common radius on a plurality of record storage surfaces of the respective direct access storage devices;
further including the steps of:
upon bypassing said front store, continuing to bypass the front store for subsequent data-access requests from a fast-channel means which relate to data stored in said backing store within the same cylinder of tracks that is associated with said bypassed data transfer.

72. The method set forth in claim 70 further including the steps of:
upon completing a data transfer, examining the data contents of the front store with respect to data capacity of said backing store with respect to the just-completed data transfer, if the data contents of the front store is less than the associated data contents of the backing store related to such completed data transfer; then for a slow-channel means completed data transfer, transferring data from said backing store to said front store to complete the copy of data in said front store; and
for a fast-channel means completed data transfer, examining previous data transfers, then based upon such examination, completing said copy of data in said front store only if predetermined criteria of said examination are met and including for second predetermined criteria of said examination removing data from said front store associatable with said completed data transfer that has been stored in said front store.

73. The method set forth in claim 70 further including the steps of:
receiving a mode-indicating signal from a one of said channel means which indicates a given alteration of a mode of operation with respect to a predetermined set of ensuing data transfers;
for said ensuing data transfers being with a fast-channel means, modifying the operational relationships between said front store, said backing store and said fast channel means in a manner to facilitate said ensuing data transfers in accordance with said received mode-indicating signal; and
for said ensuing data transfers with a slow-channel means, transferring data through said front store between said slow-channel means and said backing store, then altering the data contents of said front store resulting from said ensuing data transfers in accordance with said received mode-indicating signals.

74. The method set forth in claim 70 further including the steps of:
for said common least-recently used replacement control, establishing an ordered list of allocatable and addressable data storage areas of said front store and adjusting said ordered list in accordance with data transfers with either said fast-channel means or said slow-channel means and in accordance with a given mode of operation currently occurring within said data-storage hierarchy.

75. The method set forth in claim 70 further including the steps of:

receiving a sequential-mode-indicating signal from a one of said channel means; and
for subsequent data transfers associatable with said sequential-mode-signal, upon the completion of each data transfer with either a fast- or slow-channel means, promoting data from said backing store to said front store having a predetermined logical relationship to said just-completed data transfer.

76. The method set forth in claim 70 further including the steps of:
during said series of requests writing data to said buffer store for updating data stored therein; and
effectively removing said updated data from said buffer store as said predetermined data.

77. The method set forth in claim 70 further including the steps of:
receiving from said given channel an indication that sequential data is being processed;
writing data to said buffer after receiving said sequential data indication; and
removing said updated data in said cache which was updated subsequent to receiving said sequential indication bit as said predetermined data.

78. The method set forth in claim 70 further including;
updating data stored in said front store a plurality of times that is stored in a given addressable area of said front store; and
effectively removing from said front store said updated data that was updated a plurality of times as said predetermined data.

79. The method set forth in claim 70 further including:
identifying a last storage area accessed in said series of requests; and
upon completion of said series of requests promoting data from said backing store to said buffer store only when predetermined write operations did not occur in said series of requests from either a fast- or slow-channel means.

80. The method set forth in any of claims 72, 73, 74, 75, 76, 77, 78, 79 wherein said buffer is an electronic random access memory and said backing store includes a plurality of addressable DASDs;
further including the steps of:
addressing said data-storage hierarchy in accordance with the address of a given one of said DASDs; and
separately monitoring a series of requests for each of said addressable DASDs whereby the data in said front store is controlled in accordance with the respective addressed DASD and the type of channel accessing said respective addressed DASD.

81. The method of operating a data-storage hierarchy having a backing store having a given data-transfer rate and a caching buffer store with means to store data in said buffer based upon addressable data-storage areas of said backing store, both of said stores having a plurality of addressable data-storage areas; said hierarchy being attached to a host via a set of fast channels having at least said given data transfer rate capability and a set of slow channels having data transfer rate capabilities less than said given data transfer rate for transferring data with the host over either set of channels and receiving host supplied read or write data-access requests over either set of channels;
for data-access requests received from a said slow channel, queuing data in said buffer store for later transfer to said backing store in accordance with said received write data-access requests; and analyzing said read data-acccess requests, moving data to said buffer store from said backing store in accordance with said received read data-access requests whereby subsequently received read-data access requests from either of said channels tend to relate to data stored in said buffer store.

82. A data-storage hierarchical system including, in combination:

a plurality of slow- and fast-channel connection means, said slow-channel means being capable of transferring data at less than a given rate and said fast-channel means being capable of transferring data at least at said given rate;

a front store having a first plurality of allocatable and addressable data-storage areas;

a backing store having a second plurality of allocatable and addressable data-storage areas;

data-transfer means for coupling said front store to said backing store for data transfers therebetween at said given rate, for coupling said front store to said fast- and slow-channel connection means for data transfers therebetween at respective channel determined data-transfer rates, and for coupling said backing store to said fast-channel means for data transfers therebetween at said given rate;

a digital computer having a control store for storing and supplying program signals for enabling said digital computer to execute programs to operate said data-storage system in accordance with commands received from said fast- and slow-channel connection means, said digital computer being connected to said fast- and slow-channel connection means for transferring command and status signals therewith, being connected to said front store for operating same as a data buffer for said backing store, and being connected to said data-transfer means for controlling same in accordance with said stored program signals and said received commands and for transferring command signals to said backing store for controlling same to supply and receive data signals from and to said data transfer means such that data is stored in said front store in accordance with predetermined criteria;

said control store further having program signals for enabling said digital computer to receive a mode-indicating signal from a one of said channel means and for interpreting said received mode-indicating signal for a predetermined set of ensuing data transfers with a fast-channel means for limiting access to the front store for such data transfers to thereby facilitate data transfers between said backing store and said fast-channel means in accordance with said received mode-indicating signal and for data transfers with a slow-channel means associatable with said received mode-indicating signals continuing to use said front store but managing the data contents of said front store with respect to such data transfers for limiting the time and residency of such data within the front store and enabling said digital computer to continue other data transfers with said fast- and slow-channel means in an interleaved manner without undue interference therebetween.

83. The data-storage system set forth in claim 82 wherein:

said control store further including stored program signals for enabling said digital computer to respond to data transfers between a fast-channel means and said data-storage system to asynchronously promote data from said backing store to said front store for facilitating said data transfers whenever said mode-indicating signal is not applicable and having other program signals for enabling said digital computer to transfer data signals from said backing store to said front store substantially synchronously to data transfers between said slow-channel means and said data-storage system.

84. The data-storage system set forth in claim 82 wherein:

said control store has further stored program signals for enabling said digital computer to identify allocated ones of said front store data-storage areas in an ordered list and having further stored program means for enabling said digital computer for said list in accordance with usage of such data-storage areas in said front store by any of said channel means; and further stored program signals in said control store for enabling said digital computer to demote data from said data-storage areas of said front store in accordance with said ordered list independent of data transfers between either said fast- or slow-channel means and including further stored program signals for altering said ordered list in accordance with predetermined criteria based upon received signals from a one of said channel means with respect to predetermined data transfers with a given channel means.

85. The data-storage system set forth in claim 84 wherein:

said given channel means is a slow-channel means and said received signal is a signal indicating that said front store should be bypassed for said predetermined data transfers.

86. The data-storage system set forth in claim 82 wherein:

said control store has stored program signals for limiting data residency of said front store with respect to data transfers between a fast-channel means and said data-storage system and ensuring that all data being transferred with a slow-channel means has at least momentary residency in said front store.

* * * * *